US010444828B2

(12) United States Patent
Chehade et al.

(10) Patent No.: US 10,444,828 B2
(45) Date of Patent: Oct. 15, 2019

(54) METHODS AND APPARATUS FOR PROVIDING PROCEDURE GUIDANCE

(71) Applicant: Atheer, Inc., Mountainview, CA (US)

(72) Inventors: Mohamed Nabil Hajj Chehade, Los Angeles, CA (US); Chieh Wang, San Jose, CA (US); Mohamed Fayez Taha, Campbell, CA (US); Karim Fikani, San Mateo, CA (US); Paul Neil Iglesias Paulino, San Jose, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

(21) Appl. No.: 15/838,926

(22) Filed: Dec. 12, 2017

(65) Prior Publication Data

US 2018/0203503 A1 Jul. 19, 2018

Related U.S. Application Data

(60) Provisional application No. 62/446,012, filed on Jan. 13, 2017.

(51) Int. Cl.
*G09G 5/00* (2006.01)
*G06F 3/01* (2006.01)
*G02B 27/01* (2006.01)
*G06Q 10/10* (2012.01)
*G06F 3/0484* (2013.01)
(Continued)

(52) U.S. Cl.
CPC ............ *G06F 3/011* (2013.01); *G02B 27/017* (2013.01); *G05B 19/41865* (2013.01); *G06F 3/017* (2013.01); *G06F 3/0484* (2013.01); *G06F 16/00* (2019.01); *G06Q 10/06313* (2013.01); *G06Q 10/109* (2013.01); *H04L 67/32* (2013.01); *H04L 67/36* (2013.01); *G02B 2027/014* (2013.01);
(Continued)

(58) Field of Classification Search
CPC ........ G06F 3/011; G06F 3/0484; G06F 17/30; H04L 67/36; H04L 67/32; G06Q 10/109; G06Q 10/06313; G05B 19/41865; G02B 27/017; G02B 2027/0187; G02B 2027/0141; G02B 2027/014
See application file for complete search history.

(56) References Cited

U.S. PATENT DOCUMENTS

| 5,729,214 | A | * | 3/1998 | Moore | ............. | G08G 1/096716 |
| | | | | | | 340/525 |
| 2015/0146007 | A1 | * | 5/2015 | Dusik | ................ | G06K 9/00671 |
| | | | | | | 348/161 |
| 2015/0268469 | A1 | * | 9/2015 | Marsh | .................. | G02B 27/017 |
| | | | | | | 345/8 |

* cited by examiner

*Primary Examiner* — Nelson M Rosario
*Assistant Examiner* — Andrew Lee
(74) *Attorney, Agent, or Firm* — Mohr Intellectual Property Law Solutions, PC

(57) ABSTRACT

Apparatuses and methods of operating the same are described. An apparatus including a display, an input device, and a processing device coupled to the display and the input device. The processing device may send an output to the display. The output may include a graphical object associated with a first step of a user-implemented procedure. The processing device may receive an input from the input device. The input may indicate a progress on an execution of the first step by an operator. The processing device may determine whether the input indicates that the operator has completed the first step. The processing device may determine whether the first step is a final step in the user-implemented procedure. The processing device may identify a second step in the user-implemented procedure when the
(Continued)

input indicates that the operator has completed the first step and the first step is not a final step.

20 Claims, 10 Drawing Sheets

(51) Int. Cl.
    *G06F 16/00*     (2019.01)
    *G05B 19/418*     (2006.01)
    *G06Q 10/06*     (2012.01)
    *H04L 29/08*     (2006.01)

(52) U.S. Cl.
    CPC ................ *G02B 2027/0141* (2013.01); *G02B 2027/0187* (2013.01)

METHODS AND APPARATUS FOR PROVIDING PROCEDURE GUIDANCE

CROSS-REFERENCE TO RELATED APPLICATION

This application claims the benefit of U.S. Provisional Application No. 62/446,012, filed Jan. 13, 2017.

BACKGROUND

Guidance for and/or confirmation of a procedure being carried out by (or partly by) an operator may be facilitated in a number of ways. For example, a paper document such as a maintenance checklist may be prepared beforehand, with instructions for each event that is to be executed, a box to be checked or initialed by the operator to confirm events have been executed, blanks to record data or comments associated with events in the procedure, etc. However, such static instructions and documentation may exhibit limitations in at least some instances.

For example, linear paper checklists may not closely correspond with procedures that may be non-linear. As a more concrete example, in performing maintenance on complex systems such as aircraft engines, the appropriate procedure may branch, loop back, or be otherwise non-linear depending on the condition of the engine itself, a paper checklist may not accommodate adding a sequence to lubricate some engine component if it is determined to be necessary upon inspection, skipping replacement of a presumed worn part if the part is in fact not worn, etc.

In addition, simple paper checklists or similar may be limited in terms of the guidance that may be offered, and/or the feedback that may be accepted. To continue the example above, a paper checklist may lack space for detailed drawings showing the individual engine components to be serviced or for a specific maintenance history for the particular engine being serviced, may not support evidence or confirmation that a new component has been installed properly beyond a check-off, sign-off, etc.

Furthermore, static guidance and feedback may not adapt well to changing conditions. Modest changes to an engine or to "best practices" in engine maintenance may render entire checklists (or at least significant portions thereof) obsolete. Appropriate procedures may even vary depending on the age or history of a particular engine, e.g. a 10-year-old engine may be prone to different maintenance issues than a nominally-identical newer engine, an engine that has shown an unusual history of wear to certain components may benefit from greater attention to those or related components for that specific engine, etc.

SUMMARY

An apparatus including a display, an input device, and a processing device coupled to the display and the input device. The processing device may send an output to the display. The output may include a graphical object associated with a first step of a user-implemented procedure. The processing device may receive an input from the input device. The input may indicate a progress on an execution of the first step by an operator. The processing device may determine whether the input indicates that the operator has completed the first step. The processing device may determine whether the first step is a final step in the user-implemented procedure. The processing device may identify a second step in the user-implemented procedure when the input indicates that the operator has completed the first step and the first step is not a final step.

DETAILED DESCRIPTION

Figure 1:
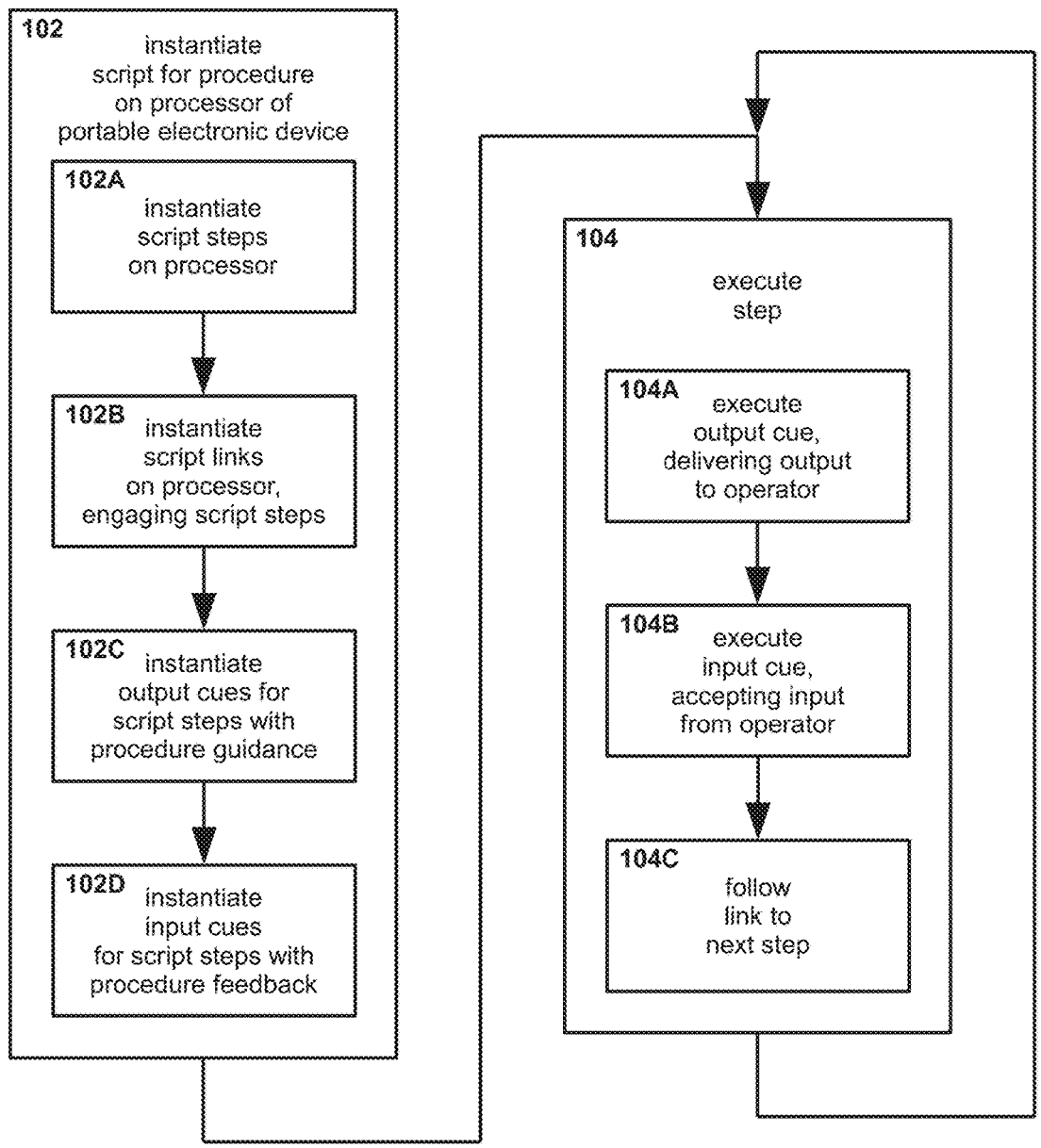
FIG. 1 shows a flowchart for confirming the execution of a procedure with regard to a script operator, according to an embodiment.

A variety of systems, apparatus, methods, and paradigms for providing guidance for executing a procedure, and for confirming the execution of the procedure, are contemplated herein. In a broad and non-limiting overview, a procedure to be performed is guided (and potentially represented) by a script. The script is configured so that executing the script substantially corresponds to executing the procedure.

It is noted that certain parts of the script may exist as data and/or executable instructions, for example as may be carried out by a processor in an electronic device such as a smartphone, head mounted display, etc. However, scripts typically include outputs to an operator performing the procedure (e.g. by following the script), inputs from that operator, outputs and inputs to or from other actors, commands and/or data to or from sensors, communications devices, and/or other hardware, etc. Moreover, the actions taken by an operator following the script typically are "real world" physical actions, such as servicing a machine, disassembling or reassembling some device, etc. Thus while the script may include processor-implemented features, the script and use of the script overall are not exclusively processor-implemented.

Again with regard to a broad but non-limiting overview, a script includes steps that correspond with various events for the procedure, such as instructions for tasks to be performed as part of the procedure, diagrams or other information supporting proper performance of the procedure, data to be taken in performing the procedure, evidence to be recorded showing that the procedure has been performed properly, etc. Links within the script connect various steps so that one step follows another in an order suited to the procedure in question.

Such an arrangement of steps and links in a script may be at least somewhat analogous to a flowchart. However, where a fixed paper flowchart may be essentially "dead", a script may be interactive with the operator (and/or potentially other persons or systems) such as by providing outputs and accepting inputs, and also may be adaptive to local conditions such as by branching, looping, contacting a remote expert, etc. depending on how a particular performance of the procedure unfolds. Thus in some sense, a script may be considered as an "active flow chart".

With regard to particulars and examples of providing guidance for executing a procedure and confirming the execution of the procedure, it may be useful to provide brief explanations of a number of terms.

An "operator" refers to a person performing some task. For example, an aircraft mechanic may be an operator for a task associated with the repair or maintenance of an aircraft. Operators may vary greatly and are not limited. In addition, it is not required for an operator to perform all actions associated with a given task; for example, if an aircraft mechanic is repairing a landing gear photographs may be taken automatically as the mechanic works, without the mechanic necessarily triggering those photographs. Two or more operators may be associated with a given task, or with certain actions that are part of that task. In principle, it may be possible for certain tasks to be performed entirely without an operator, though for purposes of example herein it is typically assumed that an operator is present and participating.

A "procedure" refers to the performance of some task. For example, inspecting or replacing the tires on an aircraft landing gear may be a procedure. Typically though not necessarily a procedure is relatively complex, with many individual actions, but no particular limits are placed on the degree of complexity. For many (though not necessarily all) procedures addressed herein, at least some part of the procedure is carried out by an operator (as distinct from being fully automated, taking place entirely within a processor, etc.).

An "event" refers to some particular action or other portion of a procedure. For example, "loosen the bolts to remove the cover", "examine the tire tread", or "check the serial number for the landing gear assembly" may all be events in a procedure. As with a procedure overall, events thereof are not limited with regard to a degree of complexity. However, typically (though not necessarily) an event may be relatively simple, and/or brief, e.g. one action in assembling a device, one or a group of a few related inspections, a well-defined test sequence, etc.

A "script" refers to a set of operator instructions, processor instructions, information, feedback, options, etc. that correspond with a procedure, such that executing the script at least substantially corresponds to executing the procedure. The degree of correspondence is not limited, nor is perfect or total correspondence with the procedure required. A script may exclude and/or summarize portions of a procedure, for example a script that includes a step for tightening bolts may not individually address each bolt, may not provide specific instructions on how to tighten bolts, may not specify that a wrench is to be used, etc. (though such specificity is not prohibited). It may be suitable to omit details and actions so long as the procedure reasonably may be understood, e.g. so that an operator would understand and be able to carry out a procedure by following a script for that procedure. The presumed capabilities of operators may vary; a script for a trained aircraft mechanic may presume a high level of experience with aircraft repair generally, and may not include the same level of detail as a script for an emergency field repair by an untrained individual. Likewise, a script for repairing plumbing directed to a new homeowner may presume little or no knowledge of plumbing and thus be extremely detailed, while a script for the same repair procedure directed to a professional plumber may presume much greater knowledge of plumbing and be much less detailed. Conversely, however, a script that presumes greater skill may, in fact, be more complex, for instance including additional options; to continue the example of the plumbing repair, a script for a professional plumber may prompt the plumber to consider which of several varieties of repair would be most suitable (most economical, quickest, sturdiest, etc.), while a script for a new homeowner may simply provide a "one size fits all" solution on the assumption that the operator, in that case, may not have the experience to make a judgment as to what repair is suitable. The degree to which a given script should correspond to a given procedure thus is to at least some extent variable, as may be understood by a person of skill in the art.

A "step" refers to a portion of a script addressing some action, typically though not necessarily corresponding with an event in a procedure. For example, if an event in a procedure is tightening the bolts on some piece of hardware, a step corresponding with that event may include instructions to tighten the bolts, an augmented reality feature pointing out the bolts, an indication of which size wrench may be appropriate, etc. However, it is emphasized that steps in a script (and thus a script overall) are not limited only to providing information. A step may include additional features, including receipt of data (e.g. the torque values used to tighten the bolts), actions not taken by the operator and/or not visible to the operator (e.g. automatically taking a photograph of the assembly that may show whether the bolts are properly installed), communication with other parties (e.g. a referencing a database to call up a schematic for a particular device, contacting an expert in a machine, a task, etc., a supervisor or inspector to "sign off" on some action, etc.), storing or retrieving data, data processing (e.g. analyzing an image of a machine to determine if it is the machine that is to be worked on), etc. A step also may represent a decision to be made; for example, if step A could be followed by either step B1 or step B2, determining whether to proceed to step B1 or step B2 may be addressed as a step in itself In addition, although certain steps may include interaction with and/or actions taken by an operator, not all steps necessarily will; certain steps may, for example, be executed entirely automatically, e.g. by a processor, by a sensor, etc. To continue the example above with regard to the decision step for determining to follow step B1 or B2, although in some instances the operator may make that decision, in other instances the decision may be made automatically (and thus from their standpoint the operator "doesn't do anything" for that decision step).

A "link" refers to a portion of a script that indicates sequencing among steps, e.g. "proceed from step 6 to step 7". Typically though not necessarily links in a script corresponding to a practical sequencing of events in a procedure. While links themselves may not be or equate to actions, it may be understood that the arrangement of links among steps in some sense defines steps into a script, rather than a mere collection of unrelated instructions. That is, A, B, and C may be mere steps; linking those steps into an arrangement that begins with A, then proceeds to B, then moves on to C may assemble those steps into a script. In addition, it is noted that while in certain examples links may be arranged in linear fashion, such that steps form a script that might be expressed as A→B→C→D→E . . . , links also may be arranged in more complex and/or non-linear fashions, for example A→(B1 or B2)→C→D→(B1 or B2) . . . and so forth. The arrangement of links (and thus the overall organization of a script) may vary greatly, and at least in principle may be arbitrarily large and/or complex.

A "cue" is a particular feature of a step that is specified in a script. For example, an output cue may specify output that is to be delivered for a step, when, how, in what form, etc. An input cue may specify input that is to be received for a step, through what avenue (e.g. a photograph from a camera, text or voice input, etc.), in what form, and so forth. Typically though not necessarily, each step in a script will have at least one cue associated therewith. Steps may have multiple inputs associated therewith, including cues of the same general type (e.g. several output cues) and cues of different types (e.g. an output cue and an input cue). In addition, a single cue may be associated with multiple steps. For example, an output cue for delivering a "boilerplate" warning to an operator that components are hot or that a grounding strap must be worn by may be associated with several or even all steps in a script, thus being executed again for each such step.

It is noted that an output cue is not necessarily identical to the output itself. For example, an output may be a schematic for a device that is being repaired, while the output cue may specify that the schematic is to be displayed graphically on a display, that the schematic is to be positioned in a particular portion of the display, that the schematic is to be shown only in response to a verbal command from the user (e.g. the user says "schematic"), etc. Likewise, while a data retrieval cue to access that schematic from stored memory is in some sense addressing output (namely the schematic), again the cue referring to the output and the output itself are not identical.

With regard to "output cue" and "input cue", the directions of "in" and "out" refer to the script. Thus an output cue addresses something (e.g. information) moving from the script (e.g. instructions to the operator), while an input cue addresses something moving to the script (e.g. data from a sensor). Although useful for illustration, it should be understood that such an arrangement may not always be literally true; for example an image that is to be delivered as an output for an output cue may not literally exist within the script (instead being an image file that is called from a hard drive, etc.), and thus may not literally come from or originate in the script (although literally including the image file as part of the script itself also is not prohibited).

In addition, it should be understood that certain of the definitions used herein may be at least somewhat flexible. For example, different scripts may consider removing each of several bolts to be individual events (potentially with different steps for each bolt), but may alternately consider removing all bolts a single event, or again alternately may consider exposing a machine for maintenance by removing numerous bolts, covers, etc. a single event, etc. While some degree of consistency within a procedure and among related or similar procedures may be desirable, no particular precise or universal limits are imposed on what "counts" as a step, an event, a procedure, etc. so long the necessary functionality is enabled.

The embodiments are directed to a variety of systems, apparatus, methods, and paradigms for providing guidance for executing a procedure, and for confirming the execution of the procedure.

In one embodiment, a method is provided that includes instantiating a script for a user-implemented procedure onto a processor of a portable electronic device. The script includes script steps with each step corresponding with an event of the procedure, and script links corresponding with sequencing the events and with each step except the final step being engaged with a subsequent step by at least one links. Each step includes an output cue associated with the script step and specifying a graphical output from the processor to the operator for the step, the graphical output including guidance to the operator for executing the event of the procedure associated with the step. Each step also includes an input cue associated with the script step and specifying a graphical input from the operator to the processor for the step, the input providing feedback regarding the operator executing the event of the procedure associated with the step. The method includes executing an initial step: executing the output cue including delivering the graphical output and executing the input cue including accepting the input. If the input cue and the output cue are satisfied, and the step is not the final step, the link is followed to the subsequent step. Executing the script substantially corresponds to executing the procedure.

In another embodiment, a method is provided that includes instantiating a script for a procedure onto a processor, the procedure being at least partially operator-implemented. The script includes steps corresponding to events of the procedure and links corresponding with sequencing the events, with each step except a final step being engaged with a subsequent step by at least one link. The script includes cues, each cue being associated with at least one step and each step having at least one cue associated therewith. The cues include output cues specifying output from the processor, at least one output cue specifying the output being to the operator, the output to the operator including guidance to the operator for executing the procedure. The cues also include input cues specifying input to the processor, at least one input cues specifying the input being from the operator, the input from the operator providing feedback regarding the operator executing the procedure. The method includes executing an initial step: executing the output cue if the step has an output cue associated therewith, and executing the input cue if the step has an input cue associated therewith. If the input cue and the output cue are satisfied, and the step is not the final step, the link is followed to the subsequent step. Executing the script at least substantially corresponds to executing the procedure.

The output specified by the output cue may include text, a schematic, a graphic, an image, an animation, a video, audio, augmented reality content, virtual reality content, stereo content, an executable instruction, and/or an external communication.

The output cue may execute automatically. The output cue may execute responsive to a timer, a user command, and/or an environmental factor.

An output cue may specify the output being to a recipient other than the operator.

Delivering the output from the processor may satisfy the output cue. Satisfying the output cue may include confirming delivery of the output.

The input specified by the input cue may include text, an image, a video, audio, augmented reality content, virtual reality content, stereo content, an executable instruction, an external communication, a selection input, a machine-readable code, and/or sensor data.

The input cue may execute automatically.

The output cue may execute responsive a timer, a user command, and/or an environmental factor.

Receiving the input to the processor may satisfy the input cue. Satisfying the input cue may include confirming a receipt of the input, confirming a presence of content in the input, confirming a type of the content in the input, confirming a format of the content in the input, confirming the content in the input satisfies an input standard, and/or confirming a presence of a feature in the content in the input.

The cues may also include an identity cue specifying establishing an identity of the operator, the processor and/or the script. The cues may also include an operator communication cue specifying establishing a communication between the operator and an entity other than the operator and the processor. The cues may also include a processor communication cue specifying establishing a communication between the processor and an entity other than the operator and the processor. The cues may also include a processing cue specifying data analysis of the input and/or the output within the processor. The cues may also include a storage cue specifying storage of data by the processor. The cues may also include a retrieval cue specifying access of stored data by the processor.

The steps and links may be configured such that the script is non-linear. At least one of the steps may be engaged with multiple links to multiple subsequent steps. At least one step may include multiple cues.

In another embodiment, an apparatus is provided that includes a body adapted to be worn on a head of an operator, a processor engaged with the body, a stereo graphical display in communication with the processor and disposed on the body such that when the body is worn by the operator the graphical display is facing and proximate eyes of the operator, a depth camera in communication with the processor and disposed on the body such that when the body is worn by the operator the depth camera faces at least substantially forward with respect to the head of the operator, and a color camera in communication with the processor and disposed on the body such that when the body is worn by the operator the color camera faces at least substantially forward with respect to the head of the operator. The apparatus includes a script for a user-implemented procedure instantiated on the processor. The script includes script steps with each step corresponding with an event of the procedure, and script links corresponding with sequencing the events with each step except a final step being engaged with a subsequent step by at least one link. Each step includes an output cue associated with the script step and specifying a graphical output from the processor to the operator for the step, the graphical output including guidance to the operator for executing the event of the procedure associated with the step. Each step includes an input cue associated with the script step and specifying a graphical input from the operator to the processor for the step, the input providing feedback regarding the operator executing the event of the procedure associated with the step. The processor is adapted to execute the script beginning with an initial step. Executing the steps includes executing the output cue including delivering the graphical output to the operator via the stereographical display, and executing the input cue including accepting the input from the operator via at least one of the depth camera and the color camera. If the input cue and the output cue are satisfied, and the step is not the final step, the link is followed to the subsequent step. Executing the script substantially corresponds to executing the procedure, In another embodiment, an apparatus is provided that includes a processor, an outputter in communication with the processor, an inputter in communication with the processor, and a script for a procedure instantiated on the processor, the procedure being at least partially operator-implemented. The script includes steps corresponding with events of the procedure, links corresponding with sequencing the events with each of the steps except a final step being engaged with a subsequent step by at least one of the links, and cues with each cue being associated with at least one step and each step having at least one cue associated therewith. The cues include an output cue specifying an output from the processor with at least one of the output cues specifying the output being to the operator and the output to the operator including guidance to the operator for executing the procedure, and an input cue specifying an input to the processor with at least one of the input cues specifying the input being from the operator and the input from the operator providing feedback regarding the operator executing the procedure. The processor is adapted to execute the script beginning with an initial step. Executing the steps includes executing the output cue if the step has an output cue associated therewith, executing the input cue if the step has an input cue associated therewith, and if the input cue and the output cue are satisfied and the step is not the final step, following the link to the subsequent step. Executing the script at least substantially corresponds to executing the procedure.

The outputter may include a graphical display, a CRT display, an LED display, an OLED display, a plasma display, a stereo display, a see-through display, an audio speaker, stereo audio speakers, and/or a wireless data link. The inputter may include a still imager, a video imager, a visible light imager, a near-infrared imager, a thermal infrared imager, a depth imager, a microphone, and/or a wireless data link. The inputter may be adapted to accept gesture input.

The apparatus may include a body adapted to be worn on the head of the operator, with the processor, the outputter, and the inputter engaged with the body.

In another embodiment, an apparatus is provided that includes means for instantiating a script for a procedure onto a processor, the procedure being at least partially operator-implemented. The script includes steps corresponding with events of the procedure, links corresponding with sequencing the events with each step except a final step being engaged with a subsequent step by at least one link, and cues with each cue being associated with at least one of the steps and each step having at least one cue associated therewith. The cues include output cues specifying output from the processor with at least one output cue specifying the output being to the operator and the output to the operator including guidance to the operator for executing the procedure, and input cues specifying input to the processor with at least one input cue specifying the input being from the operator and the input from the operator providing feedback regarding the operator executing the procedure. The method also includes means for executing an initial step of the steps. Executing the steps includes executing the output cue if the step has an output cue associated therewith, executing the input cue if the step has an input cue associated therewith, and if the input cue and the output cue are satisfied and the step is not the final step following the link to the subsequent step. Executing the script at least substantially corresponds to executing the procedure.

In another embodiment, a method is provided that includes authoring a script for a procedure onto a processor of a portable electronic device. The script includes script steps corresponding to events of the procedure, and script links corresponding to sequencing the events with each step except a final step being engaged with a subsequent step by at least one link. Each step includes an output cue associated with the script step and specifying a graphical output from the processor to the operator for the step, the graphical output including guidance to the operator for executing the event of the procedure associated with the step. Each step also includes an input cue associated with the script step and specifying a graphical input from the operator to the processor for the step, the input providing feedback regarding the operator executing the event of the procedure associated with the step.

Authoring the script includes an author disposing a graphical step avatar class on the processor, and disposing a step class associated with the step avatar class on the processor such that instantiating a step avatar from the step avatar class instantiates the step from the step class on the processor therewith. Authoring includes the author disposing a graphical link avatar class on the processor, and disposing a link class associated with the link avatar class on the processor such that instantiating a link avatar from the link avatar class instantiates the link from the link class on the processor therewith. Authoring also includes the author disposing a graphical output cue avatar class on the processor and disposing an output cue class associated with the output cue avatar class on the processor such that instantiating an output cue avatar from the output cue avatar class instantiates the output cue from the output cue class on the processor therewith. Authoring includes the author disposing a graphical input cue avatar class on the processor, and disposing an input cue class associated with the input cue avatar class on the processor such that instantiating an input cue avatar from the input cue avatar class instantiates the input cue from the input cue class on the processor therewith. Authoring further includes the author instantiating step avatars in a graphical interface for the processor so as to instantiate steps on the processor, instantiating link avatars in the graphical interface so as to instantiate links on the processor, and instantiating cue avatars in the graphical interface for the processor so as to instantiate cues on the processor. Executing the script substantially corresponds to executing the procedure.

In another embodiment, a method is provided that includes authoring a script for a procedure onto a processor of a portable electronic device, the procedure being at least partially operator-implemented. The script includes steps corresponding with events of the procedure, links corresponding with sequencing the events with each step except a final step being engaged with a subsequent step by at least one link, and cues with each the cue being associated with at least one step and each step having at least one cue associated therewith. The cues include output cues specifying output from the processor, at least one output cue specifying the output being to the operator, the output to the operator including guidance to the operator for executing the procedure. The cues also include input cues specifying input to the processor, at least one input cue specifying the input being from the operator, the input from the operator providing feedback regarding the operator executing the procedure.

Authoring the script includes an author disposing a graphical step avatar class on the processor, and disposing a step class associated with the step avatar class on the processor such that instantiating a step avatar from the step avatar class instantiates the step from the step class on the processor therewith. Authoring the script includes the author disposing a graphical link avatar class on the processor, and disposing a link class associated with the link avatar class on the processor such that instantiating a link avatar from the link avatar class instantiates the link from the link class on the processor therewith. Authoring the script also includes the author disposing a graphical output cue avatar class on the processor, and disposing an output cue class associated with the output cue avatar class on the processor such that instantiating an output cue avatar from the output cue avatar class instantiates the output cue from the output cue class on the processor therewith. Authoring the script includes the author disposing a graphical input cue avatar class on the processor and disposing an input cue class associated with the input cue avatar class on the processor such that instantiating an input cue avatar from the input cue avatar class instantiates the input cue from the input cue class on the processor therewith. Authoring the script further includes the author instantiating step avatars in a graphical interface for the processor so as to instantiate steps on the processor, instantiating link avatars in the graphical interface so as to instantiated links on the processor, and instantiating cue avatars in the graphical interface for the processor so as to instantiate cues on the processor. Executing the script at least substantially corresponds to executing the procedure.

The author may specify the output cue as including text, a schematic, a graphic, an image, an animation, a video, audio, augmented reality content, virtual reality content, stereo content, an executable instruction, and/or an external communication.

The author may specify the output cue as executing automatically. The author may specify the output cue as executing responsive to a timer, a user command, and/or an environmental factor.

The author may specify the output for at least one output cue as being to a recipient other than the operator.

The author may specify delivering the output from the processor as satisfying the output cue. The author may specify that satisfying the output cue includes confirming delivery of the output.

The author may specify that the input for the input cue includes text, an image, a video, audio, augmented reality content, virtual reality content, stereo content, an executable instruction, an external communication, a selection input, a machine-readable code, and/or sensor data.

The author may specify the input cue as executing automatically. The author may specify the output cue as executing responsive to a timer, a user command, and/or an environmental factor.

The author may specify that receiving the input to the processor satisfies the input cue. The author may specify that satisfying the input cue includes confirming a receipt of the input, confirming a presence of content in the input, confirming a type of the content in the input, confirming a format of the content in the input, confirming the content in the input satisfies an input standard, and/or confirming a presence of a feature in the content in the input.

The cues may further include an identity cue specifying establishing an identity of the operator, the processor, and/or the script, an operator communication cue specifying establishing a communication between the operator and an entity other than the operator and the processor, a processor communication cue specifying establishing a communication between the processor and an entity other than the operator and the processor, a processing cue specifying data analysis of at least one of the input and the output within the processor, a storage cue specifying storage of data by the processor, and/or a retrieval cue specifying access of stored data by the processor.

The method may include the author disposing a graphical identity cue avatar class on the processor, and disposing an identity cue class associated with the identity cue avatar class on the processor such that instantiating an identity cue avatar from the identity cue avatar class instantiates the identity cue from the identity cue class on the processor therewith. The method may include the author disposing a graphical operator communication cue avatar class on the processor, and disposing an operator communication cue class associated with the operator communication cue avatar class on the processor such that instantiating an operator communication cue avatar from the operator communication cue avatar class instantiates the operator communication cue from the operator communication cue class on the processor therewith. The method may include the author disposing a graphical processor communication cue avatar class on the processor, and disposing a processor communication cue class associated with the processor communication cue avatar class on the processor such that instantiating a processor communication cue avatar from the processor communication cue avatar class instantiates the processor communication cue from the processor communication cue class on the processor therewith. The method may include the author disposing a graphical processing cue avatar class on the processor, and disposing a processing cue class associated with the processing cue avatar class on the processor such that instantiating a processing cue avatar from the processing cue avatar class instantiates the processing cue from the processing cue class on the processor therewith. The method may include the author disposing a graphical storage cue avatar class on the processor, and disposing a storage cue class associated with the storage cue avatar class on the processor such that instantiating a storage cue avatar from the storage cue avatar class instantiates the storage cue from the storage cue class on the processor therewith. The method may include the author disposing a graphical retrieval cue avatar class on the processor, and disposing a retrieval cue class associated with the retrieval cue avatar class on the processor such that instantiating a retrieval cue avatar from the retrieval cue avatar class instantiates the retrieval cue from the retrieval cue class on the processor therewith.

The author may configure the steps and links such that the script is non-linear. The author may engage at least one of the steps with a plurality of the links to a plurality of the subsequent steps. The author may assign a plurality of the cues to at least one the step.

The graphical interface may include a drag-and-drop interface. The step avatars may be adapted to be dragged-and-dropped onto a script space of the graphical interface to configure the steps for the script. The link avatars may be adapted to be dragged-and-dropped onto a script space to configure the links for the script. The link avatars may be adapted to be drawn among the step avatars to configure the links for the script. The output cue avatars may be adapted to be dragged-and-dropped onto the step avatars to associate the output cues with the steps, the input cue avatars may be adapted to be dragged-and-dropped onto the step avatars to associate the input cues with the steps.

The output cue avatars may include a menu and/or a command line within the step adapted to configure the output cues associated with the steps, and the input cue avatars may include a menu and/or a command line within the step adapted to configure the input cues associated with the steps.

In another embodiment, an apparatus is provided that includes a body adapted to be worn on a head of an author, a processor engaged with the body, a stereo graphical display in communication with the processor and disposed on the body such that when the body is worn by the author the graphical display is facing and proximate eyes of the author, a depth camera in communication with the processor and disposed on the body such that when the body is worn by the author the depth camera faces at least substantially forward with respect to the head of the author, a color camera in communication with the processor and disposed on the body such that when the body is worn by the author the color camera faces at least substantially forward with respect to the head of the author, and a graphical interface disposed on the processor. The graphical interface includes a graphical step avatar class disposed on the processor and a step class associated with the step avatar class disposed on the processor such that instantiating a step avatar from the step avatar class instantiates a step from the step class on the processor therewith, a graphical link avatar class disposed on the processor and a link class associated with the link avatar class disposed on the processor such that instantiating a link avatar from the link avatar class instantiates a link from the link class on the processor therewith, a graphical output cue avatar class disposed on the processor and an output cue class associated with the output cue avatar class disposed on the processor such that instantiating an output cue avatar from the output cue avatar class instantiates an output cue from the output cue class on the processor therewith, and a graphical input cue avatar class disposed on the processor and an input cue class associated with the input cue avatar class disposed on the processor such that instantiating an input cue avatar from the input cue avatar class instantiates an input cue from the input cue class on the processor therewith.

Each step is adapted to correspond with an event of a procedure. Each link is adapted to correspond with sequencing the events. The output cues are adapted to be associated with at least one script step and to specify a graphical output from the processor to an operator for the step, the graphical output including guidance to the operator for executing the event of the procedure associated with the step. The input cues are adapted to be associated with at least one script step and to specify a graphical input from the operator to the processor for the step, the input providing feedback regarding the operator executing the event of the procedure associated with the step. The steps, the links, the input cues, and the output cues cooperate to form a script, the script being at least partially operator-implemented, and executing the script substantially corresponds to executing the procedure.

In another embodiment, an apparatus is provided that includes a processor, an outputter in communication with the processor, an inputter in communication with the processor, and a graphical interface disposed on the processor. The graphical interface includes a graphical step avatar class disposed on the processor and a step class associated with the step avatar class disposed on the processor such that instantiating a step avatar from the step avatar class instantiates a step from the step class on the processor therewith, a graphical link avatar class disposed on the processor and a link class associated with the link avatar class disposed on the processor such that instantiating a link avatar from the link avatar class instantiates a link from the link class on the processor therewith, a graphical output cue avatar class disposed on the processor and an output cue class associated with the output cue avatar class disposed on the processor such that instantiating an output cue avatar from the output cue avatar class instantiates an output cue from the output cue class on the processor therewith, and a graphical input cue avatar class disposed on the processor and an input cue class associated with the input cue avatar class disposed on the processor such that instantiating an input cue avatar from the input cue avatar class instantiates an input cue from the input cue class on the processor therewith.

Each step is adapted to correspond with an event of a procedure, and each link is adapted to correspond with sequencing the events. The output cues are adapted to be associated with at least one script step and to specify a graphical output from the processor to an operator for the step, the graphical output including guidance to the operator for executing the event of the procedure associated with the step. The input cues are adapted to be associated with at least one script step and to specify a graphical input from the operator to the processor for the step, the input providing feedback regarding the operator executing the event of the procedure associated with the step. The steps, the links, the input cues, and the output cues are adapted to cooperate to form a script, the script being at least partially operator-implemented. Executing the script substantially corresponds to executing the procedure.

The processor may be disposed within a head-mounted display, a desktop computer, a laptop computer, a tablet computer, a smartphone, and/or a portable electronic device.

In another embodiment, a method is provided that includes means for authoring a script for a procedure onto a processor of a portable electronic device, the procedure being at least partially operator-implemented. The script includes steps corresponding to events of the procedure, links corresponding with sequencing the events with each step except a final step being engaged with a subsequent step by at least one link, and cues with each the cue being associated with at least one of the steps and each the step having at least one the cue associated therewith. The cues include output cues specifying output from the processor, at least one output cue specifying the output being to the operator, the output to the operator including guidance to the operator for executing the procedure. The cues also include input cues specifying input to the processor, at least one input cue specifying the input being from the operator, the input from the operator providing feedback regarding the operator executing the procedure.

The means for authoring the script include means for disposing a graphical step avatar class on the processor and disposing a step class associated with the step avatar class on the processor such that instantiating a step avatar from the step avatar class instantiates the step from the step class on the processor therewith, means for disposing a graphical link avatar class on the processor and disposing a link class associated with the link avatar class on the processor such that instantiating a link avatar from the link avatar class instantiates the link from the link class on the processor therewith, means for disposing a graphical output cue avatar class on the processor and disposing an output cue class associated with the output cue avatar class on the processor such that instantiating an output cue avatar from the output cue avatar class instantiates the output cue from the output cue class on the processor therewith, and means for disposing a graphical input cue avatar class on the processor and disposing an input cue class associated with the input cue avatar class on the processor such that instantiating an input cue avatar from the input cue avatar class instantiates the input cue from the input cue class on the processor therewith. The means for authoring the script also include means for instantiating step avatars in a graphical interface for the processor so as to instantiate steps on the processor, means for instantiating link avatars in the graphical interface so as to instantiated links on the processor, and means for instantiating cue avatars in the graphical interface for the processor so as to instantiate cues on the processor. Executing the script at least substantially corresponds to executing the procedure.

In another embodiment, a method is provided that includes enabling authoring of a script for a procedure onto a processor of a portable electronic device. The script includes script steps corresponding to events of the procedure, and script links corresponding to sequencing the events with each step except a final step being engaged with a subsequent step by at least one link. Each step includes an output cue associated with the script step and specifying a graphical output from the processor to the operator for the step, the graphical output including guidance to the operator for executing the event of the procedure associated with the step, and an input cue associated with the script step and specifying a graphical input from the operator to the processor for the step, the input providing feedback regarding the operator executing the event of the procedure associated with the step.

Enabling authoring of the script includes an architect defining a graphical step avatar class adapted to be disposed on the processor, defining a step class adapted to be disposed on the processor, and associating the step class with the step avatar class such that instantiating a step avatar from the step avatar class instantiates the step from the step class on the processor therewith. Enabling authoring of the script includes the architect defining a graphical link avatar class adapted to be disposed on the processor, defining a link class adapted to be disposed on the processor, and associating the link class with the link avatar class such that instantiating a link avatar from the link avatar class instantiates the link from the link class on the processor therewith. Enabling authoring of the script includes the architect defining a graphical output cue avatar class adapted to be disposed on the processor, defining an output cue class adapted to be disposed on the processor, and associating the output cue class with the output cue avatar class such that instantiating an output cue avatar from the output cue avatar class instantiates the output cue from the output cue class on the processor therewith. Enabling authoring of the script includes the architect defining a graphical input cue avatar class on the processor, defining an input cue class associated with the input cue avatar class, and associating the input cue class with the input cue avatar class such that instantiating an input cue avatar from the input cue avatar class instantiates the input cue from the input cue class on the processor therewith.

Enabling authoring of the script includes the architect defining a graphical interface for the processor adapted to enable an author to instantiate step avatars in the graphical interface for the processor so as to instantiate steps on the processor, to instantiate link avatars in the graphical interface so as to instantiate links on the processor, and to instantiate cue avatars in the graphical interface for the processor so as to instantiate cues on the processor. Executing the script substantially corresponds to executing the procedure.

In another embodiment, a method is provided that includes enabling authoring of a script for a procedure onto a processor of a portable electronic device, the procedure being at least partially operator-implemented. The script includes steps corresponding with events of the procedure, links corresponding with sequencing the events with each step except a final step being engaged with a subsequent step by at least one link, and cues with each cue being associated with at least one step and each step having at least one cue associated therewith. The cues include output cues specifying output from the processor, at least one output cue specifying the output being to the operator, the output to the operator including guidance to the operator for executing the procedure. The cues also include input cues specifying an input to the processor, at least one input cue specifying the input being from the operator, the input from the operator providing feedback regarding the operator executing the procedure.

Enabling authoring of the script includes an architect defining a graphical step avatar class adapted to be disposed on the processor, defining a step class adapted to be disposed on the processor, and associating the step class with the step avatar class such that instantiating a step avatar from the step avatar class instantiates the step from the step class on the processor therewith. Enabling authoring of the script includes the architect defining a graphical link avatar class adapted to be disposed on the processor, defining a link class adapted to be disposed on the processor, and associating the link class with the link avatar class such that instantiating a link avatar from the link avatar class instantiates the link from the link class on the processor therewith. Enabling authoring of the script includes the architect defining a graphical output cue avatar class adapted to be disposed on the processor, defining an output cue class adapted to be disposed on the processor, and associating the output cue class with the output cue avatar class such that instantiating an output cue avatar from the output cue avatar class instantiates the output cue from the output cue class on the processor therewith. Enabling authoring of the script includes the architect defining a graphical input cue avatar class on the processor, defining an input cue class associated with the input cue avatar class, and associating the input cue class with the input cue avatar class such that instantiating an input cue avatar from the input cue avatar class instantiates the input cue from the input cue class on the processor therewith. Enabling authoring of the script includes the architect defining a graphical interface for the processor adapted to enable an author to instantiate step avatars in a graphical interface for the processor so as to instantiate steps on the processor, to instantiate link avatars in the graphical interface so as to instantiate links on the processor, to instantiate cue avatars in the graphical interface for the processor so as to instantiate cues on the processor. Executing the script at least substantially corresponds to executing the procedure.

The architect may define the output cue class such that the output cues are specifiable by the author to include text, a schematic, a graphic, an image, an animation, a video, audio, augmented reality content, virtual reality content, stereo content, an executable instruction, and/or an external communication.

The architect may define the output cue class such that the output cues are specifiable by the author to execute automatically. The architect may define the output cue class such that the output cues are specifiable by the author as executing responsive to a timer, a user command, and/or an environmental factor. The architect may define the output cue class such that the output cues are specifiable by the author as directing the output cues to a recipient other than the operator.

The architect may define the output cue class such that the output cues are specifiable by the author that satisfying the output cue includes delivering the output from the processor. The architect may define the output cue class such that the output cues are specifiable by the author that confirming delivery of the output satisfies the output cue.

The architect may define the input cue class such that the input cues are specifiable by the author to include text, an image, a video, audio, augmented reality content, virtual reality content, stereo content, an executable instruction, an external communication, a selection input, a machine-readable code, and/or sensor data.

The architect may define the input cue class such that the input cues are specifiable by the author to execute automatically. The architect may define the input cue class such that the input cues are specifiable by the author as executing responsive to a timer, a user command, and/or an environmental factor.

The architect may define the input cue class such that the input cues are specifiable by the author that satisfying the input cue includes receiving the input to the processor. The architect may define the input cue class such that the input cues are specifiable by the author that satisfying the input cue includes confirming a receipt of the input, confirming a presence of content in the input, confirming a type of the content in the input, confirming a format of the content in the input, confirming the content in the input satisfies an input standard, and/or confirming a presence of a feature in the content in the input.

Enabling authoring the script may include the architect defining a graphical identity cue avatar class adapted to be disposed on the processor and an identity cue class adapted to be disposed on the processor and associating the identity cue class with the identity cue avatar class such that instantiating an identity cue avatar from the identity cue avatar class instantiates the identity cue from the identity cue class on the processor therewith, defining a graphical operator communication cue avatar class adapted to be disposed on the processor and an operator communication cue class adapted to be disposed on the processor and associating the operator communication cue class with the operator communication cue avatar class such that instantiating an operator communication cue avatar from the operator communication cue avatar class instantiates the operator communication cue from the operator communication cue class on the processor therewith, defining a graphical processor communication cue avatar class adapted to be disposed on the processor and a processor communication cue class adapted to be disposed on the processor and associating the processor communication cue class with the processor communication cue avatar class such that instantiating a processor communication cue avatar from the processor communication cue avatar class instantiates the processor communication cue from the processor communication cue class on the processor therewith, defining a graphical processing cue avatar class adapted to be disposed on the processor and a processing cue class adapted to be disposed on the processor and associating the processing cue class with the processing cue avatar class such that instantiating a processing cue avatar from the processing cue avatar class instantiates the processing cue from the processing cue class on the processor therewith, defining a graphical storage cue avatar class adapted to be disposed on the processor and a storage cue class adapted to be disposed on the processor and associating the storage cue class with the storage cue avatar class such that instantiating an storage cue avatar from the storage cue avatar class instantiates the storage cue from the storage cue class on the processor therewith, and defining a graphical retrieval cue avatar class adapted to be disposed on the processor and a retrieval cue class adapted to be disposed on the processor and associating the retrieval cue class with the retrieval cue avatar class such that instantiating a retrieval cue avatar from the retrieval cue avatar class instantiates the retrieval cue from the retrieval cue class on the processor therewith.

The architect may define the step class and the link class so as to enable the script to be authored non-linearly. The architect may define the step class and the link class so as to enable the steps to engage with a plurality of links to a plurality of subsequent steps. The architect may define the step class so as to enable the steps to accommodate a plurality of the cues therein.

The architect may define the graphical interface as a drag-and-drop interface. The architect may define the step avatars so as to enable the author to drag-and-drop the step avatars onto a script space of the graphical interface to configure the steps for the script. The architect may define the link avatars so as to enable the author to drag-and-drop the link avatars onto a script space to configure the links for the script. The architect may define the link avatars so as to enable the author to draw the link avatars among the step avatars to configure the links for the script. The architect may define the output cue avatars so as to enable the author to drag-and-drop the output cue avatars onto the step avatars to associate the output cues with the steps, and may define the input cue avatars so as to enable the author to drag-and-drop the input cue avatars onto the step avatars to associate the input cues with the steps.

The architect may define the output cue avatars so as to include at least one of a menu and a command line to enable the author to associate the output cues with the steps, and may define the input cue avatars so as to include at least one of a menu and a command line to enable the author to associate the input cues with the steps.

In another embodiment, an apparatus is provided that includes means for enabling authoring of a script for a procedure onto a processor of a portable electronic device, the procedure being at least partially operator-implemented. The script includes steps corresponding with events of the procedure, links corresponding with sequencing the events with each step except a final step being engaged with a subsequent step by at least one link, and cues with each cue being associated with at least one step and each step having at least one cue associated therewith. The cues include output cues specifying an output from the processor, at least one output cue specifying the output being to the operator, the output to the operator including guidance to the operator for executing the procedure. The cues also include input cues specifying an input to the processor, at least one input cue specifying the input being from the operator, the input from the operator providing feedback regarding the operator executing the procedure.

The means for enabling authoring of the script include means for defining a graphical step avatar class adapted to be disposed on the processor, means for defining a step class adapted to be disposed on the processor and associating the step class with the step avatar class such that instantiating a step avatar from the step avatar class instantiates the step from the step class on the processor therewith, means for defining a graphical link avatar class adapted to be disposed on the processor, means for defining a link class adapted to be disposed on the processor and associating the link class with the link avatar class such that instantiating a link avatar from the link avatar class instantiates the link from the link class on the processor therewith, means for defining a graphical output cue avatar class adapted to be disposed on the processor, means for defining an output cue class adapted to be disposed on the processor and associating the output cue class with the output cue avatar class such that instantiating an output cue avatar from the output cue avatar class instantiates the output cue from the output cue class on the processor therewith, means for defining a graphical input cue avatar class on the processor, and means for defining an input cue class associated with the input cue avatar class and associating the input cue class with the input cue avatar class such that instantiating an input cue avatar from the input cue avatar class instantiates the input cue from the input cue class on the processor therewith.

The apparatus includes means for defining a graphical interface for the processor adapted to enable an author to instantiate step avatars in a graphical interface for the processor so as to instantiate steps on the processor, to instantiate link avatars in the graphical interface so as to instantiate links on the processor, to instantiate cue avatars in the graphical interface for the processor so as to instantiate cues on the processor. Executing the script at least substantially corresponds to executing the procedure.

FIG. 1 shows a flowchart for confirming the execution of a procedure with regard to a script operator, according to an embodiment. As noted previously, it may be useful to consider certain such arrangements as being or at least resembling "active flow charts". That is, a script may be visualized as a flowchart, with individual steps as being visualized as blocks within the flow chart, links as arrows, cues as instructions etc. for/within blocks representing steps, etc. However, where a conventional flowchart may be static; e.g. a printed document that merely "sits on the page", a script as described herein may be active in that the script may cause the output to be delivered, may accept input, may interact with a human operator, adapt to varying circumstances, etc. Moreover, as addressed in more detail subsequently, scripts such as described herein may be active in that the script may be readily created and modified, e.g. by "drag and drop" manipulation of steps within the script, etc.

However, it is emphasized that while the notion of an active flowchart may be illustrative, the script may not be or appear as a flow chart in actual fact (though such also is not prohibited). Thus, for an operator following the script, e.g. receiving output for certain steps, performing steps, providing input for certain steps, etc., the script may not visibly be presented as a flowchart, and indeed the script itself may not appear at all (even though output may be displayed, etc.). Thus while the notion of scripts as active flow charts may be useful in understanding certain embodiments and/or applications, it should be understood that such a notion is not limiting.

In FIG. 1, a script is instantiated 102 onto the processor of a portable electronic device. Typically though not necessarily, the processor may be a digital electronic processor, and the portable electronic device a head-mounted display, smartphone, tablet, laptop computer, etc. However, the use of a portable electronic device is an example only; so long as some capability exists to execute the steps as shown and described, substantially any device or system may be suitable. Likewise, although for purposes of explanation the processor may be considered to be a digital electronic processor adapted to execute executable instructions, the particulars of the processor are not limiting unless specifically noted herein.

Similarly, the manner by which the script is instantiated is not limited. Typically though not necessarily, the script may be instantiated onto the processor from a data store such as a hard drive, solid-state drive, cloud storage, etc., though other arrangements also may be suitable.

In instantiating 102 the script, several features may be instantiated with and/or as part of the script.

Script steps are instantiated 102A on the processor as part of the script. As noted previously, script steps (sometimes referred to herein simply as "steps") typically address some action, such as may correspond with an event in a procedure. For example, a script step may refer to events such as identifying a machine, opening or manipulating some portion of the machine, inspecting or modifying some component of the machine, etc. (though other arrangements may be suitable). In the aforementioned analogy of an active flow chart, script steps may be considered as the various "blocks" in such a flow chart.

Script links are instantiated 102B on the processor as part of the script. As also noted previously, script links facilitate sequencing among steps within a script, e.g. a link from step A to step B such that step B follows after step A. For simplicity links may be described in certain instances as being linear and unitary, that is, each step has a link from one previous step to one following step. However, multiple links may lead to and/or proceed from any given step, and thus links do not necessarily merely produce a linear sequence of steps.

Still with reference to FIG. 1, in the example arrangement therein output cues are instantiated 102C on the processor as part of the script. Output cues specify outputs from the script to some target; typically though not necessarily the output cue specifies information, a command, etc. sent from the processor to a human operator or to a device or system other than the processor. For example, an output cue might direct output of a video or an image to an operator via a graphical display, might direct output of a command to a camera to capture an image, etc. It is noted that the output cue is not necessarily equivalent to the output; the output cue specifies that output is to be sent, but does not necessarily include the output itself (though such also is not prohibited). For example, images, videos, schematics, etc. may be accessed from some source other than the script itself, such as a hard drive, solid-state drive, cloud storage, etc.

Thus, a given output cue may provide guidance, information, etc. to an operator. It is noted that output cues are not limited only to providing operator guidance; output cues may also provide guidance and/or control to other systems (e.g. sending a command to a machine to shut down for maintenance, in addition to or in place of advising the operator to ensure that the machine is shut down), may specify output to third parties, etc.

Input cues also are instantiated 102D on the processor as part of the script. Input cues specify inputs to be received from some source to the script. Typically though not necessarily the input cue accepts information, a command, etc. from the operator or some device or system other than the processor sent to the processor. For example, an input cue may receive an image from a camera, may receive voice or gesture input, may accept data communicated from an external instrument (such as an operating data file from a machine undergoing maintenance), etc. As noted with regard to output cues, input cues are not necessarily equivalent to input.

With regard to terminology, it is noted that cues typically are referred to herein as being "output" or "input" with regard to the script itself. In certain embodiments, this may be equivalent or at least similar to being outputs from the processor, or inputs to the processor, in that the script may be instantiated on the processor. That is, if the script "lives" on the processor, communicating with the processor may equate to communicating with the script.

Continuing in FIG. 1, a step in the script is executed 104. Typically though not necessarily the script itself may identify a starting step. In other instances the operator may specify an initial step, some algorithm may be in place as part of the script itself) to determine which step should be executed 104 first, etc. How the initial step is selected is not limited.

In executing 104 the script step in question, an output cue associated with the relevant step is executed 104A. Thus, whatever output is specified by the output cue is directed to whatever target is specified by the output cue, in whatever manner is specified by the output cue, etc. For example, the output cue may specify delivering a graphical rendition of a schematic to the operator via the screens of a head mounted display (e.g. one in which the processor is disposed), etc. An output cue may be very simple (e.g. display a single word or symbol on a screen, send a simple command to some device, deliver an error beep via an audio speaker), etc. However, output cues may also be very complex, and the complexity (or lack of same) of output cues is not limited. To continue the example of a schematic that is to be displayed, an output cue may for example specify that the schematic is to be delivered in mono or stereo, in color or black and white, etc., may utilize a query command for determining the optimum settings for the available display, may include an algorithm for determining what size or contrast settings to use for the display, etc.

An input cue associated with the relevant step also is executed 104B. Whatever input specified by the input cue is accepted from whatever source is specified by the input cue, etc. For example, the input cue may specify receiving information from an RFID tag on a machine that is to be serviced (possibly in response to an output cue specifying that the RFID tag be queried for that information). It is noted that such "machine to machine" inputs and associated input cues may vary considerably (in addition to variations in other types of inputs and input cues). For example, as noted RFID tags may he read; in addition, or instead, bar codes may be read, Bluetooth systems may be interrogated, wifi communication may be established, etc. Output cues likewise may be machine-to-machine and may vary in a similarly broad degree. Thus, although not limited thereto, it should be understood that machine to machine inputs and outputs may address substantially any machine capable of communicating in some manner (even if only passively, such as a barcode); consequently, many members and potentially any member of the "internee of things" may be a recipient of output and/or a provider of input.

As with output cues, input cues may be simple or complex. For example, the input cue may specify only that data must be received, may specify the format of data, may evaluate the general configuration of data (e.g. if a machine ID is known to be a six-digit numerical string, the input cue may compare the data received against some standard to verify that indeed the data is a six-digit numerical string), may specify the source of the input (e.g. verifying in some manner that the data is in fact from the correct RFID tag), may consider the data itself (e.g. is the machine ID the correct ID), etc.

It is noted that for simplicity it is assumed with regard to FIG. 1 that each step has exactly one output step and one input step. In practice, a script step may have no output cues, one output cue, or multiple output cues associated therewith, and likewise may have no input cues, one input cue, or multiple input cues associated therewith. As described in more detail subsequently herein, cues other than input and output cues also may be present, in addition to or in place of input and/or output cues.

With regard to "execution" of a cue, typically though not necessarily executing the cue is necessary and/or sufficient to satisfy the cue. That is, once whatever action is associated with a given cue is carried out—for example delivering a text message to a display, for an output cue—that cue may be considered to be satisfied. However, cues may include other requirements, standards, etc. beyond simple execution (though for simplicity in certain examples herein execution and satisfaction of a cue may be referred to as if equivalent or at least similar).

For example, an output cue may require not only delivering an output but delivering that output in a particular manner, at a particular time, to a particular device, in a particular format, to a particular operator, etc. (and likewise with input and/or other cues). In addition or instead, cues also may specify execution with particular "triggers", such as executing automatically, executing based on a manual input from an operator, etc.

Cues may require a response, an evaluation, additional actions, etc. For example, an output cue delivering a cautionary message to the operator may require, to be satisfied, that the operator then submits some indication that he or she has seen the cautionary message. Depending on configuration, the response may be a cue in itself (e.g. an input cue), or the response may be part of the output cue itself (that is, the output is not considered "properly delivered" until and unless the user verifies receipt). As another example, an input cue accepting a digital photograph may be satisfied by mere receipt of a file, but may also require and/or perform a verification that the file is an image file (e.g. by identifying the file extension as jpg, .gif, .png, etc.), may require and/or perform an evaluation of the image itself to verify that the subject matter of interest is present (e.g. through object recognition, by reading a bar code or QR code visible in the image), and so forth.

Cues may specify various conditions as well, such as environmental conditions, e.g. if it is raining, delivering a particular output cue reminding an operator that a component must be kept dry. In such instances, if the cue is not executed in the proper manner, then execution in itself may not be possible and/or may not satisfy the cue. For example, an output cue that specifies delivery to a stereo display may not be satisfied if no stereo display is available.

However, it may also be suitable to configure cues and/or their specifications so that cues may be satisfied even if not fully executed. To return to the example of a cue reminding an operator to keep a component dry, the cue may be configured so as to be satisfied even without executing (i.e. without delivering the reminder) so long as there is no rain. Alternately, cues may be simply bypassed without execution.

Thus, although in simple terms it may be convenient to refer to cues as executing, as though the cues consistently are carried out in full, cues may nevertheless be satisfied even if executed only in part or not at all. Moreover, in certain embodiments a script may be configured so that no possible case calls for all cues to be executed; that is, if there is an output cue for a message to be delivered to the operator during rain, and an alternate output cue for a message to be delivered when there is no rain, then there may be no instance when both cues are executed for a single iteration of a procedure (i.e. it cannot simultaneously both be raining and not be raining, thus at least one of the output cues will not be executed).

Still with reference to FIG. 1, in executing the step 104 a link from the step being executed then is followed 104C to the next step. The example method in FIG. 1 then continues with the step that has been linked to, thus executing 104 a subsequent step. Typically the method may proceed until either an explicit termination (a "stopping point" for the script) is reached, until no outgoing links are available, etc.

It is noted that the ordering of executing output cue 102A and input cue 102B may vary. In the example arrangement shown, an output cue is first executed 102A, then an input cue 102B. However, other arrangements may be equally suitable, and in general, it is not either logically or practically required that output cues must precede input cues. Typically, following 104C a link to the next step is to be executed once all appropriate cues have been executed; however, it is noted that in certain instances cues may be ignored. Indeed, cues themselves may be conditional. For example, an input cue may be configured such that if an RFID query is sent as an output cue, but no RFID response is received as an input cue, after a certain amount of time the output cue is executed again, or the input cue accepting the RFID response is skipped and the next cue in line (if any) is executed despite the lack of RFID response, etc. Likewise, output or input cues may exist that only execute under certain circumstances, e.g. an output cue advising an operator to immediately cease work if an unsafe condition is detected. Similarly, entire steps or groups of steps (and or links among those steps) may execute only under certain circumstances, for example, a procedure for inspecting a machine for wear may include one or more series of steps for replacing worn parts that only being executed if the parts being inspected are found to be excessively worn.

Thus, not all cues necessarily will be executed, nor will all steps necessarily be executed, nor will all links necessarily be followed, in any given use of a script or for any given script overall.

Figure 2A:
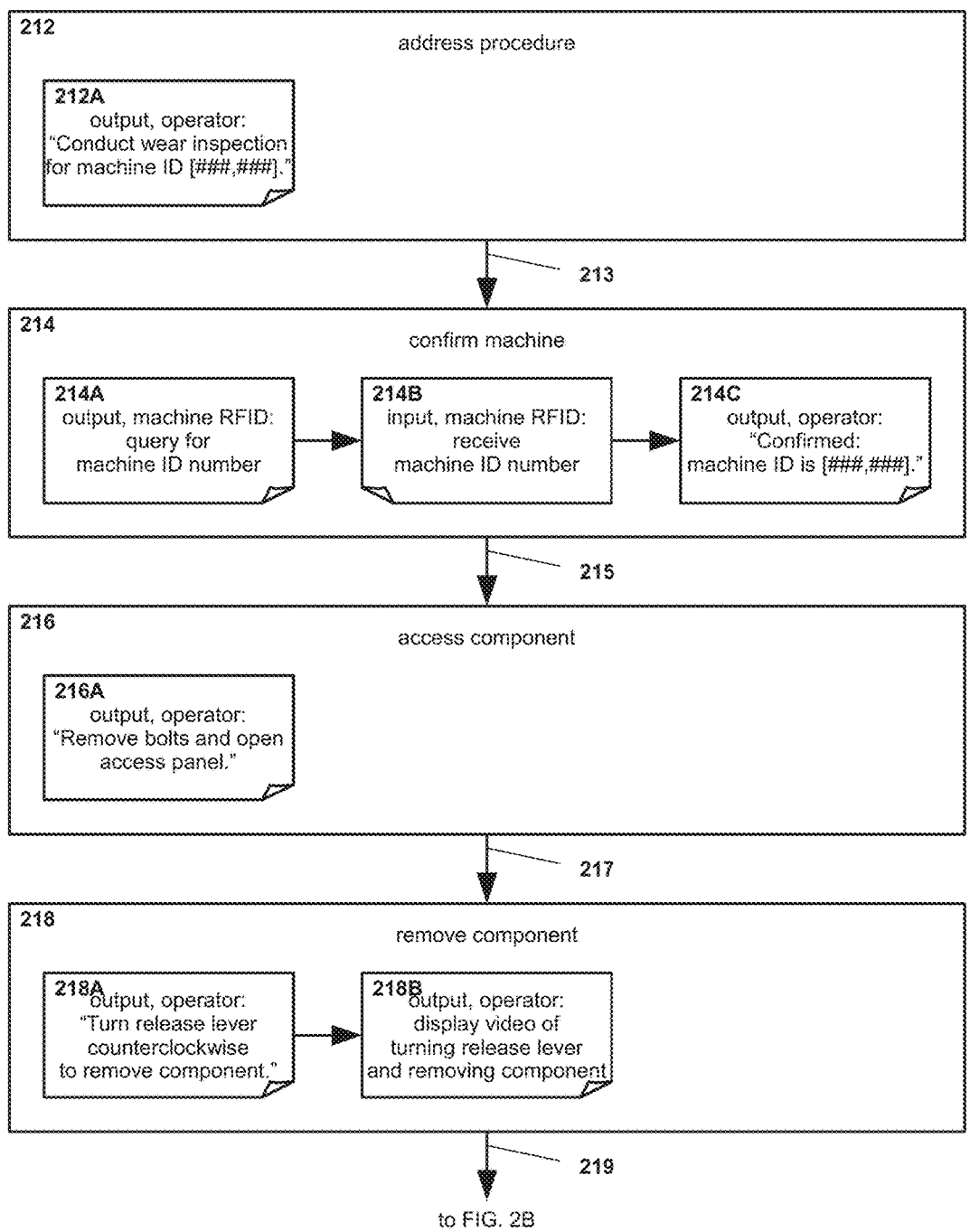
FIG. 2A shows a flowchart for the arranging of a script for guiding a procedure and confirming execution, according to an embodiment.
Figure 2B:
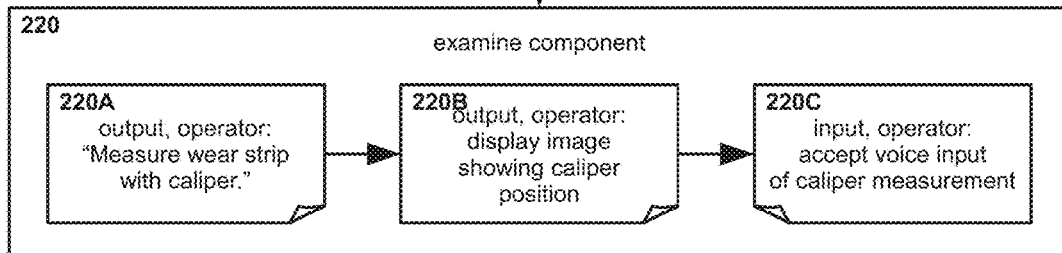
FIG. 2B shows another flowchart for the arranging of a script for guiding a procedure and confirming execution, according to an embodiment.
Figure 2B:
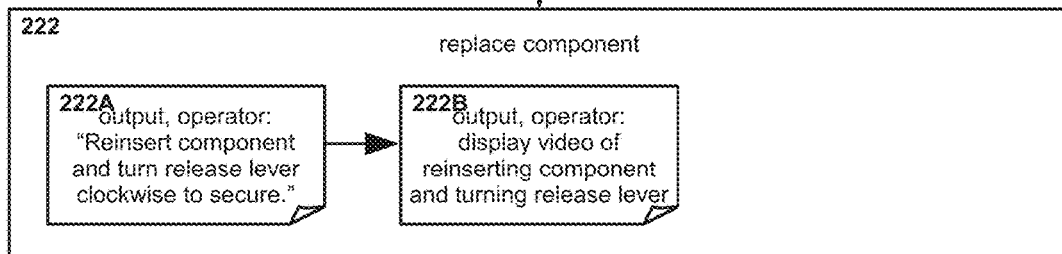
Figure 2B:
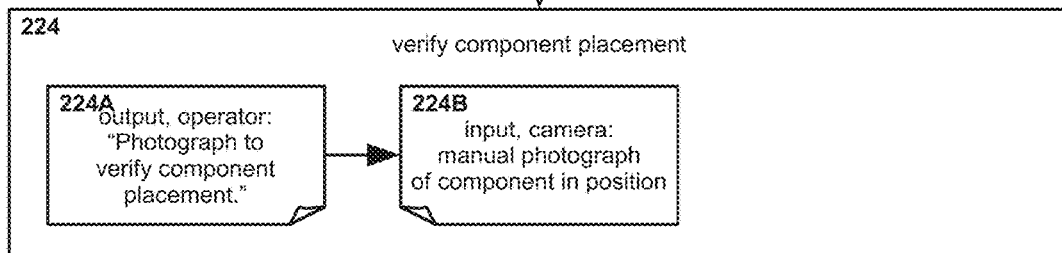
Figure 2B:
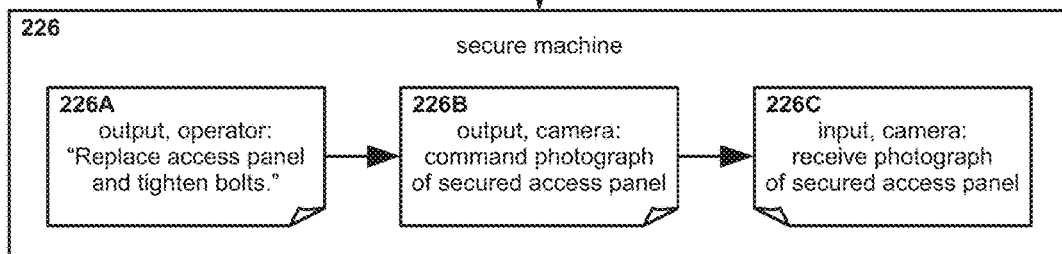

FIGS. 2A and 2B therein are shown an example arrangement of a script 200 in flow chart form. It is again emphasized that the flowchart form of the script 200 in FIG. 2A and FIG. 2B is illustrative; the script 200 may not actually have the form of a flowchart, nor is such required, however illustrating the script 200 as if the script 200 is a flowchart may be useful. Although as noted scripts may be non-linear and/or conditional, for clarity the arrangement in FIG. 2A and FIG. 2B is linear and has no contingencies (i.e. all steps and cues are presumed to be executed). In addition, it is noted that the script 200 in FIG. 2A and FIG. 2B parallels a procedure that is hypothetical; for example purposes the script 200 is presented as corresponding with a wear inspection of some machine, but the script 200 is not intended to necessarily correspond with any real-world machine or inspection procedure.

FIG. 2A shows a script 200 in the form of a flowchart for the arranging of a script for guiding a procedure and confirming execution, according to an embodiment.

(The titles/descriptions of steps, cues, etc. in FIG. 2A and FIG. 2B and in certain examples elsewhere herein are illustrative only; steps and/or cues may or may not have titles, and titles may or may not have any particular form.)

As may be seen, step 212 has one cue associated therewith, output cue 212A, illustrated as a "folded corner" rectangle disposed within step 212. Although the output cue 212A is shown as being within the step 212, this is illustrative; it is not prohibited for cues to be literally (or even figuratively) within or part of a step, but cues also are not required to be part of a step. The output cue 212A specifies output to an operator, in the form of a text message: "Wear inspection for machine ID [###,###]." (In the example shown, the numeral signs may represent a six-digit numerical ID for the machine in question).

Thus, in executing the step 212 to address the procedure, the output cue 212A would be executed, and in executing the output cue 212A the text "Wear inspection for machine ID [###,###]" would be displayed to the operator (e.g. through a graphical display on a smartphone, head-mounted display, etc.). In more colloquial terms, step 212 may be considered as telling the operator that they are to begin performing a wear inspection procedure on a particular machine.

With step 212 complete, the script proceeds along a link 213 from step 212 to step 214 for confirming the machine. This step 214 has three cues associated therewith, 214A, 214B, and 214C. As may be observed, the three cues 214A, 214B, and 214C are connected by arrows; these are not "links" in the sense of linking steps, but rather are presented to show an order of execution of the various cues 214A, 214B, and 214C. It may not be required in all cases to specify an order of execution, and the order may vary (and as noted above some cues may not execute at all in at least certain instances), however for clarity a simple linear order for cue execution is indicated in FIG. 2A and FIG. 2B.

Cue 214A is an output cue that specifies providing output to an RFID tag that is present (or at least presumed to be present) on the machine being inspected. The output for cue 214A is a query for the machine ID number. Cue 214B is an input cue that specifies accepting input from the RFID tag, with the expected input being the machine ID number as requested by cue 214A. (To distinguish visually between input and output cues, input cue 214B is shown as a folded corner rectangle like cues 214A and 214C, but with the fold on the lower left; by contrast output cues 214A and 214C show the fold on the lower right corner.) Cue 214C is another output cue, but to the operator, specifying text output: "Confirmed: machine ID is [###,###]." (As noted in practice cues may not necessarily be a simple linear progression; in some embodiments, a cue similar to 214C may exist with a message indicating that the operator is addressing the wrong machine, etc.)

Moving on in FIG. 2A, the script proceeds along link 215 from step 214 to step 216 for accessing the component that is to be inspected. One cue 216A is associated with step 216. The cue 216A is an output cue that specifies the output of text to an operator: "Remove bolts and open access panel." Once step 216 is executed, the script 200 continues along link 217 from step 216 to step 218.

Step 218 addresses removing the component that is to be inspected. Step 218 has two cues 218A and 218B associated therewith as shown in FIG. 2A. Cue 218A is an output cue to the operator specifying text output (e.g. via a display): "Turn release lever counterclockwise to remove the component." Cue 218B is also an output cue to the operator (again e.g. via a display), showing a video of the release lever being turned and the component being removed. As noted previously the ordering of cues is not necessarily limited to what is shown herein, or to any particular arrangement. An example may be seen in step 218, in that although cue 218B is shown to follow cue 218A, it may be equally suitable for cue 218A to follow cue 218B, or for cues 218A and 218B to be executed together, etc. That is, it may be equally suitable to output the text instruction before the video (as shown), or the video before the text instruction, or the text instruction and the video at once.

FIG. 2B shows another flowchart for the arranging of a script for guiding a procedure and confirming execution, according to an embodiment. Moving from FIG. 2A to FIG. 2B, a link 219 leads from step 218 in FIG. 2A to step 220 in FIG. 2B (the link 219 being shown in both FIG. 2A and FIG. 2B).

Step 220 refers to examining the component (removed previously in step 218 in FIG. 2A). Three cues 220A, 220B, and 220C are associated with step 220. Cue 220A is an output cue to the operator specifying text output: "Measure wear strip with a caliper." Cue 220B is also an output cue to the operator, specifying the output of an image showing the proper caliper positioning for measuring the wear strip. Cue 220C is an input cue specifying an expected voice input from the operator (e.g. via a microphone), giving the measured value of the wear strip as determined by the caliper.

Typically it may be anticipated that cues 220A, 220B, and 220C may be executed in that order, as shown by the arrows in FIG. 2B. However, it may be understood that even when some implicit ordering of cues may be present (e.g. the input for the caliper measurement may be anticipated as taking place after the instruction to perform the caliper measurement), as noted certain cues may be ignored, sequencing may be changed, etc. For example, if the operator were sufficiently familiar with the procedure corresponding with the script 200, the operator may measure the wear strip and speak the caliper measurement into a microphone (specified by cue 220C) before the text and image are delivered to the operator (220A and 220B). In such case cues 220A and 220B may be executed anyway, or cues 220A and 220B may be skipped, etc. However, such adaptability is not required, and certain embodiments may even exclude such adaptability by design; for a critical procedure, it may be desirable (e.g. for safety purposes) to configure a script such that each step, each link, each cue, etc. are carried out precisely scripted. In such case, delivering an input specified by an input cue before a preceding output cue has been executed (or similar) may prompt an error response, revert the procedure to an earlier cue or step, etc.

Still with reference to FIG. 2B, once step 220 is executed a link 221 is followed from step 220 to step 222. Step 222 references replacing the component in the machine following the measurement (in step 220). Step 222 in some sense a reverse of step 218, and the cues 220A and 220B are similar to those in step 218. Cue 222A is an output cue to the operator specifying text output: "Reinsert component and turn release lever clockwise to secure." Cue 222B is an output cue to the operator showing a video of the component being re-inserted and the release lever being turned.

With step 222 executed, a link 223 is followed to step 224. Step 224 addresses confirming that the component has been properly re-inserted. An output cue 224A specifies output to the operator with text instructions: "Photograph to verify component placement." An input cue 224B specifies an anticipated input of the photograph as delivered by the operator manually activating a camera (e.g. on the portable electronic device) to document the position of the component in the machine.

Step 224 being complete, the script 200 advances along a link 225 to step 226. Step 226 refers to securing the machine following the inspection. An output cue 226A to the operator specifies text output: "Replace access panel and tighten bolts." Another output cue 226B specifies sending a command to a camera to capture a photograph showing that the access panel has been properly secured. An input cue 226C specifies receiving an expected photograph (e.g. a digital image) from the camera in response to the command specified in output cue 226B.

In some sense receiving a camera image documenting that access panel has been replaced and bolted (as in cue 226C) may be considered to complete the procedure. Similarly, the script 200 as shown in FIG. 2A and FIG. 2B is complete following the execution of step 226 and the cues 226A, 226B, and 226C thereof.

However it should be understood that embodiments of scripts may continue after the procedure to which those scripts correspond are nominally complete, and/or scripts may include steps and/or cues that do not necessarily correspond precisely to events within the relevant procedure. For example, automatically capturing an (as in step 226, cues 226B and 226C) may or may not technically be considered part of the procedure; the procedure may be considered to be complete when the panel is bolted, not when the panel being bolted is documented photographically. Likewise, subsequent analysis, data transfer, etc. related to the procedure may be part of the script and may take place outside the procedure itself, e.g. data collected during the procedure may be archived by the processor into a data store, may be processed with algorithms, may be reported to some oversight entity, etc.

Similarly, procedures may include events not directly paralleled by a script. For example, filing a paper "sign-off" with a regulatory body may be considered to be part of a maintenance procedure, but may not be reflected by a script for that procedure. Thus, although a given script may be intended to and may in fact substantially correspond with a particular procedure, there may not be a perfect and/or comprehensive one-to-one match between a procedure and a script for that procedure.

In the arrangement shown in FIG. 2A and FIG. 2B, output cues and input cues are shown. However, other cues may be present in various embodiments, in addition to and/or in place of output cues and input cues. In some sense, cues may be considered collectively as being "something that's supposed to happen" in a step of a script (and/or as something that does indeed happen in an event of a procedure to which the script corresponds). Indeed, output cues and input cues may be treated in some instances as similar, i.e. as "just cues"; there may be little fundamental difference between an input cue and an output cue aside from the direction in which information and/or action flows.

However, it may be useful nevertheless to describe certain varieties of cues. This should be understood to be illustrative, rather than limiting; not all cues described herein necessarily must or will be present in all embodiments, nor are cues other than those described prohibited. (In addition, for further discussion below regarding the creation of scripts, the notion of different varieties of cues also may be useful.)

Cues may be broadly considered in terms of what the cues specify, e.g. output or input for output cues and input cues respectively.

A cue wherein the identity of some entity is determined may be referred to as an identity cue. For example, it may be desirable to determine the identity of an operator; certain operators may be trained for a particular procedure while others are not trained, some operators may be certified or legally licensed while others are not, some operators may have authorization to carry out a procedure (or even to access the script corresponding to that procedure) while others do not, some operators may be authorized to use the particular processor and/or a device with the processor therein while others are not so authorized, etc.

Determining the identity of an operator may be carried out in a variety of manners. For example, for a head-mounted display, a camera aimed toward the wearer (e.g. for eye tracking) may image the operator's face, and face recognition then could be used to determine the identity of the operator. Similarly, for a smartphone, a camera image of the user might be obtained. Other arrangements also may be suitable.

It is noted that determining "the identity" of an operator does not necessarily mean specifying a single human being. Rather, in some embodiments, it may be sufficient to verify that a given operator is one of a group without necessarily determining which individual within that group the operator may be. Likewise, it may be sufficient to determine whether an operator is properly equipped (e.g. an operator may be authorized for a particular procedure only if the operator is wearing proper safety gear).

In addition, it may be desirable to determine the identity of other entities as well. For example, identifying the processor may enable tagging records generated by the script (if any) with the serial number (for example) of the processor or device, so as to support a traceable chain of data. Identifying a device in which the processor is disposed may enable confirmation that the device is suited for a given procedure, e.g. the device has the appropriate sensors, the device is suited for a particular environment (rated for cold or heat, certified as intrinsically safe for use around flammable gases, etc.), and so forth. Identifying the script itself may enable verifying that the script being used is the proper and/or most recent version for a given procedure. Other identifications, and thus other forms of identity cues, also may be suitable.

A cue wherein communication is established between the operator and some other entity may be referred to as an operator communication cue. Since in some sense output and input cues may be considered to address communication between the operator and the processor, typically an operator communication cue may be considered to exclude cues that address only communication between the operator and the processor. (However, as noted the definitions of types of cues are not rigid or otherwise limited, and while varieties, as described herein, may be illustrative other arrangements may be suitable.)

An operator communication cue may, for example, facilitate communication between an operator and a colleague, a supervisor, a regulatory individual or agency, an expert on some relevant subject, a database of blueprints or maintenance logs, etc. Thus, as part of a procedure and/or a script (and at least potentially being logged or otherwise noted by/within that script), an operator may discuss the state of a machine being serviced with a colleague who serviced the machine previously, may consult an expert on that machine if problems or unexpected results are encountered, etc. In some sense, the operator may by use of the script have an expert always "at the ready" (or an inspector for sign-off, a parts department for ordering replacement components, etc.). Multiple entities may be communicated with, e.g. as a sort of "conference call", within the procedure itself. It is noted that such other entities—e.g. experts, supervisors, etc.—need not be physically present, nor even close by. If an operator is performing maintenance on (for example) an obscure engine component for which there exists a single "go to person" knowledgeable about that component, the script thus may facilitate communication with that knowledgeable person within the procedure itself.

A cue wherein communication is established between the processor and some other entity may be referred to as a processor communication cue (again in at least some instances excluding the operator as that other entity, since input and output cues may already represent such operator-processor communication). In some sense, nearly any communication within the scope of a script could be considered "processor communication", for example in that a video conference with an expert may well be managed by the same processor managing the script. However, it may be convenient to consider processor communication cues to address communications more directly by the processor, such as networking with other processors, accessing databases with the processor, etc.

A cue wherein data and/or executable instructions are stored may be considered a storage cue. Likewise, a cue wherein data and/or executable instructions are retrieved may be considered a retrieval cue.

As noted with regard to input and output cues above in the example of FIG. 2A and FIG. 2B, inputs and/or outputs specified by input and output cues may include data that is of value or interest, but that may or may not be part of the script proper. For example, images, videos, etc. that are to be displayed to an operator as output may or may not be instantiated as a script itself. While including such data within a script is not prohibited (and it may be useful to include commonly used data within the script itself), neither is it required that all or even any output data must be part of a script. For example, while it may be useful to have the option to output a detailed set of schematics for a given machine, or a comprehensive maintenance log, etc., such information may not be necessary or even useful every time a given procedure is performed, by every possible operator. As a more concrete example, a general maintenance script for a laptop computer may include images showing in detail how to replace the hard drive, but such data may not be needed when merely cleaning the cooling fans.

Similarly, input data such as photographs collected, text entered, voice inputs, etc. as may be associated with input cues may be of sufficient interest as to merit storage, but it may not be necessary or useful to preserve such data within the script itself.

Thus, storage and retrieval cues may be part of a script, facilitating data management within that script. The operator may not even be directly aware of such cues, and there may be no external indication that such cues exist or are being executed. That is, an operator may see schematics that are displayed (e.g. as specified by an output cue), but may not be aware (and may not need to be aware) that those schematics were accessed as specified by a retrieval cue. More generally, not all cues of any sort necessarily will have any directly visible sign of presence or execution to an operator; while an output cue to an operator or an input cue from an operator may be apparent to that operator, other cues (including input or output cues not addressed to the operator) may be "transparent" to the operator.

Indeed, a script overall, and/or the arrangement of steps, links, cues, etc. in a script, may be in at least some sense transparent to the operator. That is, the operator may not be aware, and may not need to be aware, of what the overall configuration of the script is, i.e. what steps exist, which step follows which step, what cues are associated with each step, whether cues are unique to a step or are associated with multiple steps, etc. Rather, the operator may simply receive outputs and send inputs as prompted by cues for various steps, and follow through the procedure as the script advances via links from one step to another. The operator thus may actively carry out a procedure, receiving guidance in carrying out that procedure and providing feedback from that procedure, without necessarily being familiar with the whole of the procedure. More colloquially, the operator may not know the procedure, and may not see "the big picture" (nor is such necessarily required).

A cue relating to a contextual link between some element related to a script and some other element or elements may be referred to as a context cue. The notion of a context cue is broad and may be somewhat non-intuitive, thus some explanation may be in order.

In essence, a context cue is a cue that in some manner acquires and/or associates information for a step, procedure, etc. Typically though not necessarily, context cues may be at least partially automated.

As a more concrete example, consider an arrangement wherein an operator is following a procedure to replace a tire on a particular model of aircraft, at a particular airport. A context cue may be attached to a script and/or to one or more steps in that script, such that when the operator approaches that aircraft the specific maintenance log for that aircraft is automatically searched for (e.g. in a maintenance database for the airport, though this is an example only), or so that specific procedural requirements or notes for maintenance at that airport are accessed, etc. Similarly, the context could include known maintenance issues, the location of tools needed, the availability of a suitable bay, etc.

It is noted that context cues may, in fact, be entirely functional applications unto themselves, rather than merely being data or flags attached to a step or script. (This may be likewise true with other cues, but given the breadth and flexibility of what may be considered the context for various embodiments, context cues that are in fact context "apps" may be particularly notable.) Thus, a context cue may be a link to a context app, which may for at least some embodiments receive inputs, send outputs, process data, etc. as an entity distinct from the script, communicating the script without being part of the script in strict terms.

Thus, context cues (and/or context apps, if a distinction is made therebetween for a given embodiment) may address a wide variety of contextual factors, providing a similarly wide range of additional functionality (e.g. determining where a machine or operator is, identifying the machine, acquiring information on the particular machine, accessing any work orders on that machine and/or error codes from that machine, evaluating environmental conditions near the machine with regard to effects on the procedure to be performed, etc.)

Other varieties of cues, including but not limited to flag cues (wherein data, cues, steps, etc. may be highlighted for special attention), keyword cues (wherein some keyword or other identifier is associated with a script, a procedure, a machine, a particular instance of executing a script, etc. so as to facilitate later searching), and link cues (wherein a given machine, procedure, script, etc. is linked to another machine, procedure, script, etc. as being potentially relevant) also may be suitable. It is emphasized that cue varieties may be used where convenient but such grouping need not be rigidly defined or even used at all; in particular, overlap, redundancy, "fuzziness" etc. among groups is permissible. For example, it may be permissible for cues to be configured such that the same effects could be produced either by an output cue or a processor communication cue, etc.

What has been referred to as the "variety" of a cue may be considered more generally to be one of a number of possible features of cues. Thus in addition to considering cues as potentially divisible into different varieties for convenience, it may also be useful to consider various other potential features of cues.

Cue variety, as noted, may be considered as to grouping cues based on some broad sense of what the cue is "for", e.g. for providing an output, for accepting an input, for setting up a communication channel with some third party, for performing internal analysis, etc.

At least certain cues may be described as having an "address" feature. This is at least implicit in certain examples already described, for example, some output cues in FIG. 2A and FIG. 2B specify that the output is to be delivered to the operator (though without those examples explicitly referencing the operator as an "address"). Likewise, some input cues in FIG. 2A and FIG. 2B specify that input is from the operator (again without explicitly referring to the operator as the "address").

For simplicity, the term "address" may be used regardless of whether the address refers to a source, a destination, or both. Furthermore, an address may specify a destination, a source, or both. Where one or the other is not specified, the destination or source may be implied; for example, it may be that the source for an output cue is assumed to be the script or the processor on which the script is disposed and that only the destination is explicitly specified as an address for that Output cue.

Different levels of specificity may be suitable with regard to address; an output cue might specify one particular operator, or might specify a particular route for providing the output to the operator such as a display screen (which the operator may be presumed to be viewing). Alternately, an address for a cue may refer to the route itself without necessarily referencing the destination (e.g. the operator), thus the address for an output cue may be (or may be considered to be) a graphical display, an audio speaker, etc.

Typically though not necessarily, the address feature for a cue may be specified or "set" when the script is created or modified. However, specifying or changing an address in "mid-script" or "mid-procedure" also is not prohibited. For example, if a device has both a graphical display and an audio speaker, and the audio speaker is muted, the address for an output cue may change in mid-script from being directed to the (now-muted) speaker to being directed to the graphical display. In addition, cue features like cues, steps, etc. may be complex and/or conditional, e.g. an address feature for a cue may specify that output is to be delivered as stereo graphics if the display supports stereo output, but as mono graphics, if the stereo output is not supported. It is also noted that an address feature may not be required for all cues, and/or may be implicit rather than explicit as noted above for some or all cues. Such comments also apply similarly to other cue features as described herein (i.e., cue features other than address may be set or reset when a script is created or modified, may be complex and/or conditional, etc.).

Examples of a specific address feature for an output cue may include any operator, any of a group of operators, a specific operator, a graphical display, any available graphical display, a particular graphical display, a mono display, a stereo display, an LED display, an OLED display, a CRT display, a plasma display, a projection display, an audio speaker, any available audio speaker, a particular audio speaker, a mono speaker, a stereo speaker, and a haptic output. Examples of a specific address feature for an input cue may include an instrument, a sensor, an imager, a camera, a digital camera, a CCD camera, a CMOS camera, a visible light camera, an RGB camera, a near-infrared camera, a thermal camera, a depth camera, a microphone, a touch screen, a keypad, a manual control, and a gesture input pathway. Examples of a specific address feature for an operator communication cue may include a colleague, an expert, a specific individual, any available individual, a communication device (e.g. a smartphone, a laptop computer, a desktop computer, a head mounted display), and a destination code (e.g. an IP address, a web address, a telephone number, an email account). Examples of a specific address feature for a processor communication cue may include a processor, a processor input/output pathway, and a database. Examples of a specific address feature for a processing cue may include an algorithm, a group of algorithms, a subroutine, and a specialized processor. Examples of a specific address for a storage cue and/or a retrieval cue may include a data store, a hard drive, a removable medium, an optical medium, a magnetic medium, a solid state drive, and a cloud storage. Such examples are not limiting, and other address features (for those cues noted and/or other cues) also may be suitable.

Cues may include an actuation feature. That is, a cue may specify whether (for example) some or all of the cue is to be executed automatically, manually, etc. As a more concrete example, an input cue for receiving an image input from a camera may specify that the camera is to be actuated automatically by the processor on which the script is disposed, actuated automatically by the camera itself, actuated manually by an operator physically pressing a button (or using a command word, etc.), actuated manually by some other party (such as by a remote expert in communication with the operator), and so forth.

Cues may include a permission feature, for example, so as to specify whether certain operators, certain devices, etc. are authorized to carry out a cue, whether the cue may only be executed at certain times and places or under certain conditions, and so forth. As a more concrete example, if an inspection of an electronic component includes a permission feature specifying that a grounding strap must be worn for the inspection, the cue may not execute without confirmation that a grounding strap is being worn by the operator carrying out the inspection. (It is noted that such permissions likewise may be implemented at a step level, a procedure level, etc.)

Cues may include environmental features. That is, certain cues may execute only when certain environmental factors are present, absent, within a given range, etc. For example, an input cue for receiving an RGB image may include an environment feature that specifies the cue is only to execute when the ambient light levels are above some minimum. As another example, a related cue for receiving a near-infrared image may include a parallel environment feature that specifies the cue is only to execute if light levels are below that same minimum. (Such examples may consider that RGB cameras may function poorly in dim light, while near infrared may function poorly in sunlight or other bright light.)

Environmental features for cues may range very widely. Examples of environmental features that may be specified for various cues include but are not limited to the presence, absence, and/or levels of visible light (as noted above), other forms of light (e.g. near infrared, ultraviolet), radio waves, electromagnetic interference, toxic gases, combustible gases, combustible dusts, other flammables, ignition sources, high voltage sources, extreme heat or cold, sharp or crushing hazards, and biological, chemical, or radiological hazards. Features that may not necessarily be considered part of an "environment" in colloquial use nevertheless may be considered as environment features for cues (or may be considered as other features for cues), including but not limited to the presence or absence of people generally or certain groups or individuals, the time, the location, whether a device (if any) to be addressed is operating (e.g. when doing maintenance on a machine, is the machine turned off?), whether other devices are operating in the vicinity, etc.

Cues may include conditional and/or logical features. For example, features may specify whether other features are to be considered (e.g. always considering levels of methane gas as an environmental feature for scripts anticipated for use in oil rigs, but not considering the level of methane as an environmental feature in an agricultural setting), features may specify logical constraints (e.g. consider feature X if conditions A and B are present, unless condition C is also present, etc.).

Preceding examples of cue features are not limiting, and other features may be equally suitable. In addition, the grouping of cue features as described is an example only, and other arrangements may be suitable. For example, a time feature may be specified as distinct from environment features, all features could be collected into a single omnibus category, feature categories may be fluid and/or modifiable by operators or other persons, etc.

Furthermore, cues may also be conceptualized in terms of standards for a cue, or otherwise, rather than necessarily only in terms of features of cues. For example, an output cue may include an output standard; the output standard may define where the output is directed (to the user, to a display visible to the user, to some other person or system, etc.), how/when the output is to be delivered (immediately, automatically, upon user request, after a time delay, upon detection of some condition, etc.), the format of the output (the resolution of an image, the frame rate of a video, the initial orientation of a 3D model, etc.), required or prohibited conditions (do not deliver output when the user is otherwise occupied, only deliver stereo graphical output to a display that has stereo capability, etc.), and so forth. An input cue likewise may include an input standard, wherein the input standard may define where the output is to be acquired (from a user, via keyboard, via gesture, via a camera that may detect a gesture, via an algorithm that detects gestures within images, etc.), the format of the input (any data, audio data specifically, image data, an image with a bar code therein, a specific bar code, etc.), required or prohibited conditions (an image must be obtained when an access panel is opened, a sensor reading must be taken only when a device is not turned on, etc.), and so forth.

Regardless of the particulars of (and/or terminology used to describe) cue features, cues, steps, scripts, etc., considerable flexibility may be permissible in many instances. For example, it may not he required to execute all steps and/or cues sequentially or continuously in time, at the same position in space, by the same operator, etc. To refer again to FIG. 2A the step 212 for addressing the procedure could be performed well away from the machine that is to be inspected; the step 212 as shown advises the operator that inspection is to be conducted, but the operator may not be (and may not be required to be) near the machine at the time step 212 is executed. Other procedures may be executed (in whole or in part) or other actions taken by the operator before proceeding to step 214. Similarly, referring to FIG. 2B the step 220 for examining the component may take place some distance from the rest of the machine, i.e. at a location more suitable for measuring the wear strip as referenced by cue 220A.

Thus while a given script, step, cue, and/or feature thereof may specify or at least consider factors such as location, time, a particular operator, etc., uniformity and/or continuity of location, time, operator, etc. is not necessarily required, and indeed non-uniformity or non-continuity (e.g. executing different steps at different places, at different times, with different operators, etc.) may be useful and deliberate.

At this point, it may be useful to consider what form scripts, steps, cues, features, etc. may take. As noted, while a script may be illustrated or represented as a flowchart, the providing procedure guidance and confirming procedure execution may resemble a flow chart in terms of the actual structure thereof, to the point that it may be accurate to refer to a script as an "active flow chart". Thus it may be illuminating to extend the illustrative notion of a flow chart so as to configure a script in the form of "modules" of executable instructions. However, it is emphasized that such an approach is an example only, and is not limiting.

With regard to an "active flow chart" implementation, a generalized script framework could be established that includes executable instructions instantiated on the processor for handling aspects of executing the script that may apply to many different scripts and/or steps therefor, such as protocols for delivering output (e.g. from an output cue) to a display screen (or to a device manager for that display screen, to an operating system also instantiated on the processor, etc.). Thus, general inputs/output capabilities, processing capabilities, data logging, hardware management, etc. may be part of a script framework and/or handled through a script framework, rather than necessarily being particular to a given script (or steps thereof, etc.).

Continuing with the example, basic elements for scripts may be established in the form of "modules" of executable instructions. Rather than constructing each script step from scratch, a template of executable instructions may be created, with provision to enable links to be engaged therewith, cues to be associated therewith, and so forth. Such a template (or "class") may be instanced so as to produce modules of code representing script steps. Such an approach may sometimes be referred to as "syntactical sugar", wherein generalized classes are created for steps, and scripts then may be created by reproducing those classes (e.g. copying the executable instructions and/or data of the classes) yield steps that may form the larger script. Creating and configuring a step then may be a matter of specifying what cues may be part of (or associated with) that particular step, which links engage with the step, and so on.

Similarly, links, cues, cue features, and so forth also may be configured as modules of executable instructions. That is, a script may be a discrete (or at least semi-discrete) assembly of executable instructions that provide the overall functionality of each step other discrete assemblies of executable instructions that provide the overall functionality of links, yet other discrete assemblies of executable instructions that provide the functionality of various cues, and still other discrete assemblies of executable instructions that provide the functionality of assorted cue features, with the whole disposed in a framework of executable instructions that enables the various discrete units to cooperate to function as a script. The whole may be referred to as "modular", in that an instance of a step module may be engaged with instances of link modules, instances of cue modules may be associated with that step module, instances of cue feature modules may be associated with the various cue modules, etc.

Such an arrangement also may be viewed as a kit of parts adapted to be assembled together, wherein various modules may be selected and engaged together to form a functioning script. For example, steps may represent instances of available classes (or templates) of step modules, links may represent instances of available classes of link modules engaged with those steps, cues may represent instances of available classes of cue modules associated with those steps, cue features may represent instances of available classes of cue feature modules associated with those cues, etc. However, full modularity is not required; cues may simply be selection options within steps, cue features may be selection options within cues, etc.

As may be understood, such an arrangement may at least conceptually resemble a flowchart such as shown in FIG. 2A and FIG. 2B, wherein steps are represented by similar rectangular blocks ("instances" of a rectangular shape as may represent a "step class"), cues also are represented by similar folded corner rectangular blocks ("instances" of a folded corner rectangular shape as may represent various "cue classes"), etc.

Thus, although the arrangement in FIG. 2A and FIG. 2B is illustrative, and the script 200 depicted therein would not necessarily be a flow chart in actual fact, an embodiment of a script similar to the script 200 shown may indeed be structured at least somewhat similar to a flowchart. Each step shown may be a broadly similar module of executable instructions, each link may be a similar module of executable instructions, each cue may be a module of executable instructions (with output cues being similar to one another, input cues being similar to one another—as visually distinguished in FIG. 2A and FIG. 2B by the location of the corner folds—etc.).

Figure 3:
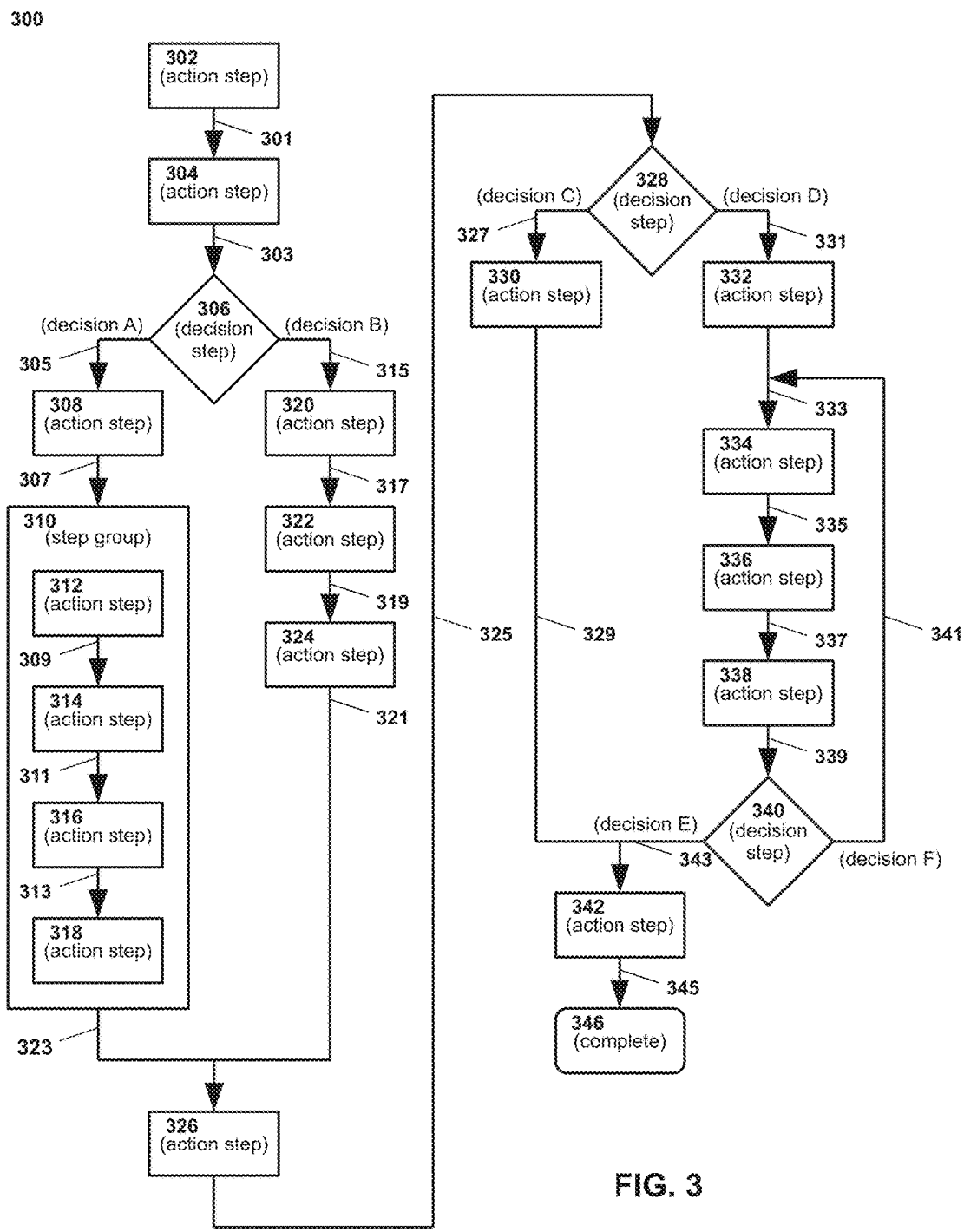
FIG. 3 shows a script is shown in flowchart form for the arranging of a script for guiding a procedure and confirming execution, according to an embodiment.

FIG. 3 shows a script 300 is shown in flowchart form for the arranging of a script for guiding a procedure and confirming execution, according to an embodiment. Now with reference to FIG. 3, as noted previously (e.g. with regard to FIG. 2A and FIG. 2B) scripts may be simple and/or linear, but such is not required, and scripts may be complex and/or non-linear. FIG. 3 shows another example of a script, more complex than that in FIG. 2A and FIG. 2B and also non-linear in general configuration. For simplicity, FIG. 3 refers conceptually to steps, etc. rather than showing concrete actions for those steps, so as to plainly illustrate examples of certain aspects of script configuration. The concepts illustrated may apply to a wide variety of different scripts and configurations, regardless of the particulars of the steps. As noted previously scripts may or may not, in fact, be configured as flow charts, but flowcharts may prove illustrative for the example of FIG. 3.

FIG. 3 shows two types of steps for the script 300 therein, action steps and decision steps. (As well as a "complete" state 346, which in some instances optionally may be classified as a step.) The distinction between action steps and decision steps (and likewise any other types of steps) is to at least some degree arbitrary and is made for illustrative purposes.

For the purposes of FIG. 3, a script step engaged with more than one link leading therefrom—reflecting more than one possible outcome of an event in a procedure as reflected by that script step—may be considered as a decision step. That is, if two or more outcomes for a given step are possible (e.g. two or more available subsequent steps, steps that may or may not be executed, etc.), then that step may be considered a decision step. It is not necessarily implied that a human is making a decision (though human decisions are not excluded); rather, a "decision" may represent a processor selection (e.g. based on executable instructions), may represent two or more possible states for a procedure (e.g. a part is broken or that part is not broken), etc.

Conversely, for purposes of FIG. 3 a step is identified as an action step if the step has only one link leading therefrom, thus the step is executed (or skipped, etc.) but no alternatives are presented and thus no decision is implied.

However, it should not be presumed that "nothing happens" in decision steps merely because decision steps are not action steps, or that action steps necessarily lack any internal options or selections by virtue of not being decision steps. As noted, the distinction reflects the overall configuration of the script 300, and should not be understood as otherwise limiting.

In the script 300, an action step 302 (referred to generically, within parentheses) shown. The action step 302 may represent substantially any action including but not limited to steps similar to those already described (e.g. with regard to FIG. 2A and FIG. 2B), for example opening a device, removing a part, taking measurements, etc.

When the action step is complete, the script 300 follows a link 301 from action step 302 to another action step 304. Likewise, upon execution of action step 304, the script follows a link 303 engaging action step 304 to a decision step 306.

The decision step 306 has two links 305 and 315 engaged therewith and leading to subsequent steps (namely action steps 308 and 320, respectively). Thus, some selection—whether an operator decision, a processor determination, a selection based on the status of the procedure itself or the state of the environment, etc.—is made, with two possible outcomes: decision A is reached and link 305 is followed to action step 308, or decision B is reached and link 315 is followed to action step 320.

For instances wherein decision A is reached, link 305 leads to action step 308. Action step 308 is then executed, and link 307 is followed therefrom.

As may be seen, link 307 in FIG. 3 engages not with an individual step but with a step group 310. As noted previously, steps may be configured as modules. As may be seen from FIG. 3, arrangements of steps, links, etc. also may be grouped together. Within the step group 310, action steps 312, 314, 316, and 318 execute in sequence following links 309, 311, and 313 as previously described with regard to other action steps in FIG. 3. With step group 310 complete, the script then proceeds along link 323 as shown.

Thus, a step group may be understood to execute similarly to individual steps. In practice such grouping may or may not be visible to an operator executing the script 300, however, in terms of the overall configuration of the script 300, it may be useful to treat assemblies of steps, links, etc. as larger units or groups.

Such an arrangement may be useful for example in creating new scripts, and/or modifying existing scripts. For example, procedures for manufacturing two closely related models of an automobile may be similar, at least in part. If both vehicles have identical dashboards, those portions of an assembly procedure relating to dashboard assembly likewise may be identical; consequently, for a script corresponding to assembly procedure the portions thereof that correspond with dashboard assembly also may be identical.

Even if a given portion of two different procedures is not identical between those procedures, those portions of the procedures nevertheless may be represented by identical sequences within a script; if a hubcap is held on with six bolts rather than five, and the script does not specify the number of bolts, the scripts may be identical even though the procedures are not.

Furthermore, if a group of steps would appear repeatedly in a script, it may be useful to configure that group of steps once, and then "call" the group each time. From the point of view of the operator, the script may appear the same either way, but the script itself may be simpler and/or more compact.

In addition, even if portions of a new script differ from portions of an old script (e.g. because a new procedure differs from an old procedure), it may be expedient to copy a portion of script—e.g. a group of steps as 310—from one script to another, as a cohesive group rather than copying or reproducing each individual step. That group then may be modified to correspond so that the new script corresponds to the new procedure, without the need to recreate the entire group.

Regardless, the step group 310 as shown in FIG. 3 is illustrative, and not limiting. Other arrangements of and/or applications for groups and grouping also may be suitable.

Moving on in FIG. 3, If decision B is reached in decision step 306 then link 315 engaged therewith is followed leading to subsequent action step 320. The script then proceeds with link 317, action step 322, link 319, action step 324, and link 321.

Regardless of whether decision A or decision B is reached in decision step 306, eventually the script arrives at action step 326 either via link 321 (from step group 310) or link 323 (from action step 324). It is noted that other arrangements may be suitable; it is not required for scripts to "come back together", and different decisions may result in following portions of a script that never rejoin, that terminate separately, that link to other scripts, etc.

With action step 326 executed, the script proceeds along link 325 engaged therewith to reach decision step 328. As with decision step 306, some determination is made in decision step 328, reaching either decision C or decision D. (Although the arrangement of FIG. 3 shows decision steps with exactly two outcomes, this is not limiting, and other arrangements may be suitable.)

If decision C is reached, the script follows link 327 from decision step 328 to action step 330. Upon executing step 330, link 329 is followed (leading to action step 342).

However, if decision D is reached, the script follows link 331 from decision step 328 to action step 332. Action steps 332, 334, 336, and 338 are executed in sequence following links 333, 335, and 337 therebetween.

Once action step 338 is complete, link 339 leads to another decision step 340. A determination is made in decision step 340 reaching either decision E or decision F. As may be seen, if decision F is reached the script then loops back to action step 334 along link 341. Thus as shown, loops (as well as other non-linear architecture) may be present in various script embodiments. Indeed, the scripts are not limited in terms of configuration or complexity and may include substantially any number and/or type of conceivable arrangements for steps, links, etc. So long as a given script functions and at least substantially corresponds to the appropriate procedure, scripts may be arbitrarily complex.

If decision E is reached in decision step 340 (or if decision C were reached previously at decision step 328), the script proceeds to action step 342 via link 343 (or likewise to action step 342 from action step 330 via link 329). Once action step 342 is executed, the script is complete; although a link 345 to a completion indicator 346 is shown for clarity in FIG. 3, it may be equally suitable simply to end the script at action step 342 (thus excluding link 345 and completion indicator 346).

It is emphasized that the method in FIG. 3 is an example only; other arrangements, whether simpler, more complex, or of similar complexity, also may be suitable.

Figure 4A:
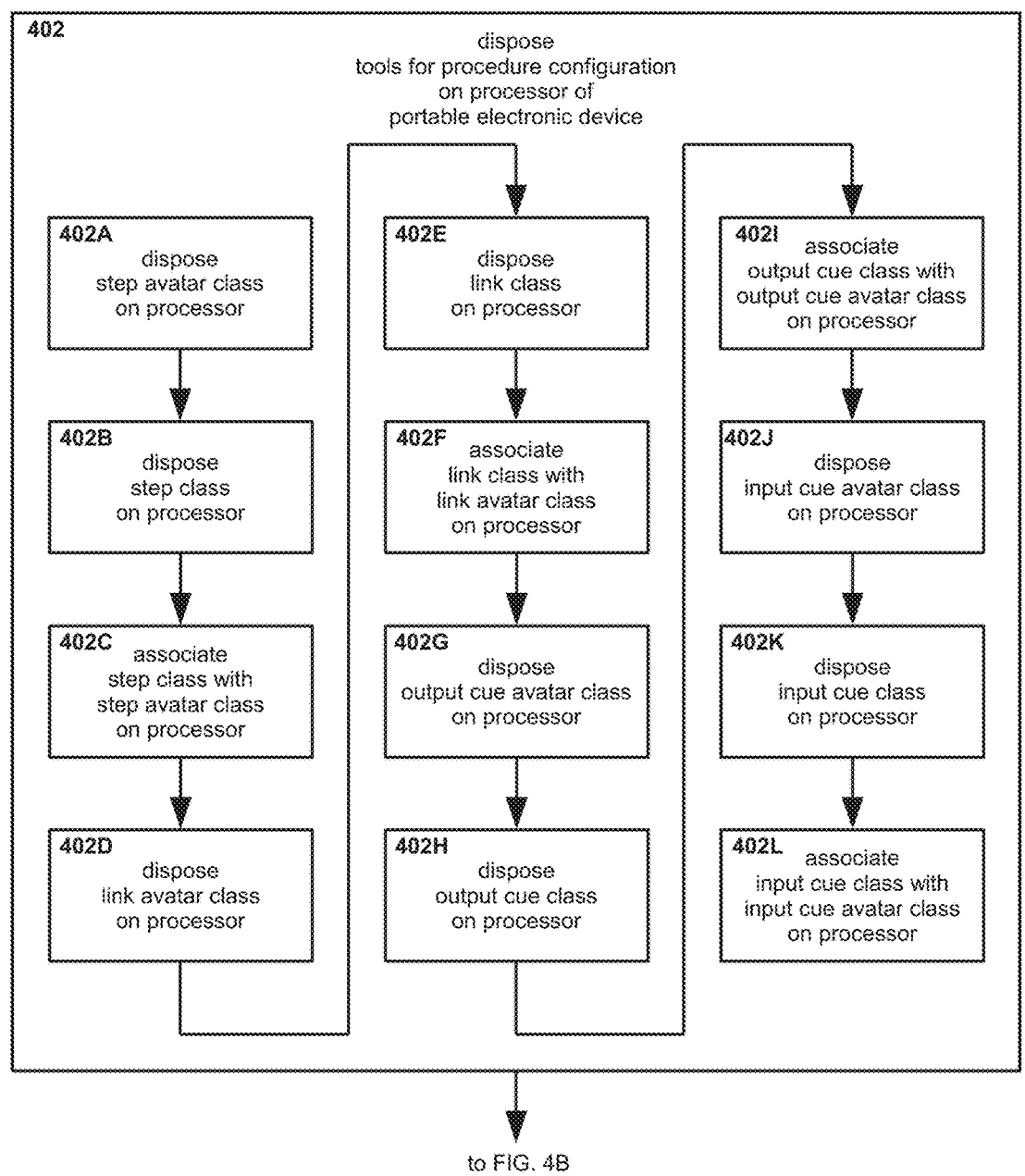
FIG. 4A shows a flowchart for the arranging of a script for guiding a procedure and confirming execution with regard to a script author, according to an embodiment.
Figure 4B:
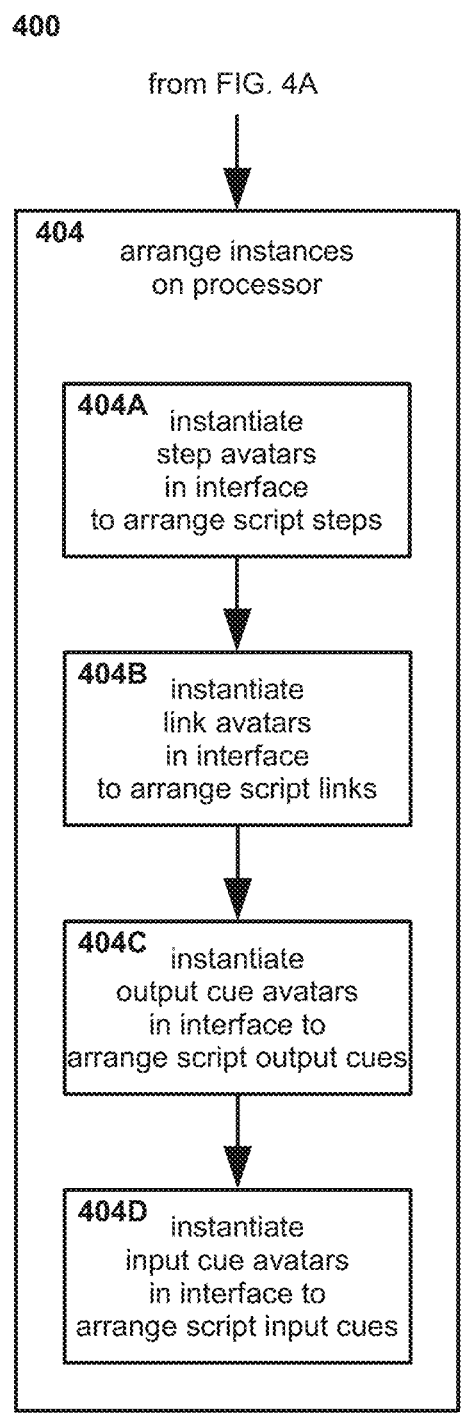
FIG. 4B shows a continuation of the flowchart from FIG. 4A for the arranging of a script for guiding a procedure and confirming execution with regard to a script author, according to an embodiment.

Now with reference to FIG. 4A and FIG. 4B, as noted various embodiments and arrangements of scripts may be executed, in whole or in part by operators such as persons wearing a head-mounted display or using some other portable electronic devices, such that executing the scripts at least substantially correspond to executing various procedures. Such scripts also may be created, modified, etc.; in such instances, persons creating and/or modifying the scripts may be referred to as "authors" of those scripts. FIG. 4A shows a flowchart 400 for the arranging of a script for guiding a procedure and confirming execution with regard to a script author, according to an embodiment. FIG. 4B shows a continuation of the flowchart 400 in FIG. 4A for the arranging of a script for guiding a procedure and confirming execution with regard to a script author, according to an embodiment. As noted previously with regard to the execution of scripts, it may be useful to provide brief explanations of certain terms associated with the creation and modification of scripts.

An "author" refers to a person creating or modifying a script. For example, an aircraft mechanic creating a script to correspond with the repair or maintenance of an aircraft may be considered the author (or at least an author) of that script. Similarly, another mechanic who later updates that script (e.g. to accommodate changes in hardware, new work standards, etc.) also may be considered an author of that script. Authors may vary greatly and are not limited. As with an operator executing a script, it is not required for an author to create or modify an entire script for a given procedure; two or more authors may cooperate to produce or change a script (potentially with those authors doing so at different times, in different places, through different devices, using different interfaces, etc.).

A "step avatar" refers to some representation of a step in a script, and associated with that step, such that placing the avatar corresponds with placing the step. For example, a flowchart icon may serve to represent a step; such an icon might be placed and/or manipulated spatially within a "desktop" style graphical interface so that authoring the script at least somewhat resembles configuring a flow chart. However, step avatars are not limited, and other arrangements may be suitable. For example, a menu, control panel, etc. as may be displayed as an augmented reality object (e.g. on a head-mounted display) also may serve as an avatar; in such case the step avatar may be placed within a script while actually performing the procedure in question, such as by calling up an appropriate menu during each event of the procedure so as to create a step in the script that corresponds with that event. (Such an arrangement may be useful in creating scripts that match the procedure as actually performed, as opposed to configuring a flow chart based on an "on paper" abstraction of the procedure.) In other embodiments, a text command or a block of code in a command line interface that specifies or represents a step may be considered to be an avatar for that step.

A "step avatar class" refers to a format for representing a step avatar. For example, considering again a flowchart icon as a step avatar, a step avatar class for that step avatar may be executable instructions that define the shape of the avatar, the behavior of the avatar within an interface (e.g. enabling drag-and-drop movement), etc. In such case, each step avatar may be considered as an instance of the step avatar class. In colloquial terms, the step avatar class may be considered a "master" or "original", with the individual step avatars being "copies" (or instances) thereof.

Steps have already been described herein.

A "step class" refers to a format for a step, with an arrangement between steps and step classes at least somewhat similar to that described for step avatars and step avatar classes. That is, the step class may define how steps actually execute, how cues are accommodated within (or otherwise engaged with) a step, and so forth. The step class thus in some sense defines the behavior and capabilities of the steps in a script.

Similarly, a "link avatar", an "output cue avatar", and an "input cue avatar" refer to representations of links, output cues, and input cues, respectively. Likewise, a "link avatar class", an "output cue avatar class", and an "input cue avatar class" refer to formats, definitions, etc. for link avatars, output cue avatars, and input cue avatars, respectively. Similarly, a "link class", an "output cue class", and an "input cue class" refer to formats, definitions, etc. for links themselves, output cues themselves, and input cues themselves, respectively. (Links, output cues, and input cues have already been described herein.)

Collectively, the various classes and instances as described above may be considered to be a set of tools or components for creating a script. As a colloquial example, if one were to consider physical bricks as instances of steps, then building a wall out of those bricks ("linked" in a particular arrangement with mortar, etc.) may be comparable to authoring a script from steps.

For simplicity, certain examples herein refer to scripts as having a single step class, a single output cue avatar class, and so forth. However, embodiments are not limited only to single classes for each element. For example, different types of steps (action steps, decision steps, etc.) may have different step classes, and such different step classes may be represented by different step avatar classes. Considering again a desktop graphical interface as an example, this may represent several types of the step being available for use within a script, with each type of step being represented by a different icon (e.g. a different shape, color, etc.

With regard to interface, it should be understood that to at least some degree the nature of the various classes and instances thereof may define the interface in which those classes and instances are manipulated. Conversely, it may also be said that the classes and instances may to some degree define the interface. (In some sense, creating fully functional avatar classes may be considered to in fact be the creation of a functional interface.) Thus, a desktop graphical interface may be associated with desktop-style graphical icon avatars, a graphical augmented reality interface may be associated with graphical augmented reality menus, a command line interface may be associated with command line avatars, etc. However, the particulars of an interface are not otherwise limited.

Referring again to FIG. 4A, tools for authoring 400 a script are disposed 402 onto the processor. A number of such tools may be disposed onto the processor in such fashion. It is noted that the order of disposing such tools and/or the manner by which those tools are divided (e.g. step avatar classes being described as distinct from step classes) in the example of FIG. 4A is illustrative, and should not be understood as limiting.

Within step 402 and as a sub-step thereof, a step avatar class is disposed 402A on the processor. A step class may, for example, include executable instructions and/or data, be loaded to the processor.

It is noted that a distinction is made in terminology between "instantiating instances" on a processor and "disposing classes" on the processor. Although in a strictly technical sense instantiating an instance of a class on a processor and loading the class itself onto the processor may involve similar or identical loading of data and executable instructions, for descriptive purposes the terms "instantiating" and "loading" are treated separately, for clarity. Thus, a class is disposed; an instance of that class is instantiated. The distinction may be noteworthy at least in terms of the method itself; for example, while disposing various classes onto a processor may happen automatically or entirely within a processor (e.g. a block of software self-installs, uploads from a hard drive, downloads from a cloud, etc.), instantiating instances of those classes typically is done at least in part by a human author, that author creating various instances of various avatars so as to configure steps, links, cues, etc. associated with those avatars into a coherent and functional script.

Moving on in FIG. 4A, a step class is also disposed 402B on the processor. Step avatar classes and step classes have been described previously. The step class is then associated 402C with the step avatar class on the processor, such that instantiating a step avatar from the step avatar class will also instantiate a step from the step class on the processor therewith. That is, when an author creates a step avatar, an appropriate step itself is created; when the author moves, rearranges, modifies, etc. that step avatar, that step itself is moved, rearranged, modified, etc.

Similarly, a link avatar class is disposed 402D on the processor, a link class is disposed 402E on the processor, and the link class is associated 402F with the link avatar class such that instantiating a link avatar from the link avatar class will also instantiate a link from the link class therewith.

An output cue avatar class is disposed 402G on the processor, an output cue class is disposed 402H on the processor, and the output cue class is associated 402I with the output cue avatar class such that instantiating an output cue avatar from the output cue avatar class will also instantiate an output cue from the output cue class therewith.

An input cue avatar class is disposed 402J on the processor, an input cue class is disposed 402K. on the processor, and the input cue class is associated 402L with the input cue avatar class such that instantiating an input cue avatar from the input cue avatar class will also instantiate an input cue from the input cue class therewith.

As noted previously, multiple types of steps and links, additional types of cues, etc. may be suitable for at least certain scripts. Likewise, for authoring such scripts, multiple step classes and step avatar classes may be disposed and associated on the processor, additional cue classes and cue avatar classes may be disposed and associated on the processor, etc. Embodiments are not limited only to the arrangement shown in FIG. 4A.

Moving on to FIG. 4B, the author arranges 404 instances of the various classes on the processor. As noted, each script may include steps, links among those steps, output cues, input cues, etc. Thus, as shown in FIG. 4B arranging 404 instances to author a script may include instantiating 404A one or more step avatars onto the processor, in whatever interface may be suited for the particular avatars of a given embodiment, so as to instantiate steps of the script associated therewith (those steps, in turn, corresponding to events in a procedure). One or more link avatars are instantiated 404B onto the processor in the interface, so as to instantiate links for the script associated therewith. One or more output cue avatars are instantiated 404C onto the processor in the interface, so as to instantiate output cues for the script associated therewith (with those output cues also being associated with a given step, for example). One or more input cue avatars are instantiated 404D onto the processor in the interface, so as to instantiate input cues for the script associated therewith.

Thus, in instantiating step avatars, link avatars, output cue avatars, and input cue avatars (e.g. creating, manipulating, moving, interconnecting, etc. the avatars themselves), the author is in turn arranging steps, links, output cues, and input cues so as to form a script such that executing the script at least substantially corresponds to executing the procedure.

For illustrative purposes, it may be useful to describe as an example what the author may literally see, and/or literally do when authoring a script. As noted, avatars may take many forms, and manipulations of avatars may vary considerably from one embodiment to another. However, in at least certain instances a "flow chart" paradigm may be useful. Thus, an author may view and interact with an arrangement that is conceptually and/or visually similar to that in FIG. 3; action steps may be represented by rectangular action step avatars, decision steps by diamond shaped decision avatars, links by link avatars in the form of arrows, etc. Cues may or may not be individually visible; in certain embodiments, cues could be dragged and dropped onto individual action steps, and/or action steps might be "opened" or enlarged (e.g. by double-clicking the avatar for a given action step), etc. Steps, links, and the like may be dragged around the screen, pasted, cut, copied, etc. as in a desktop graphical interface. (Indeed, such actions could be carried out in just such an interface on a desktop PC, although other arrangements also may be similar.)

Figure 5A:
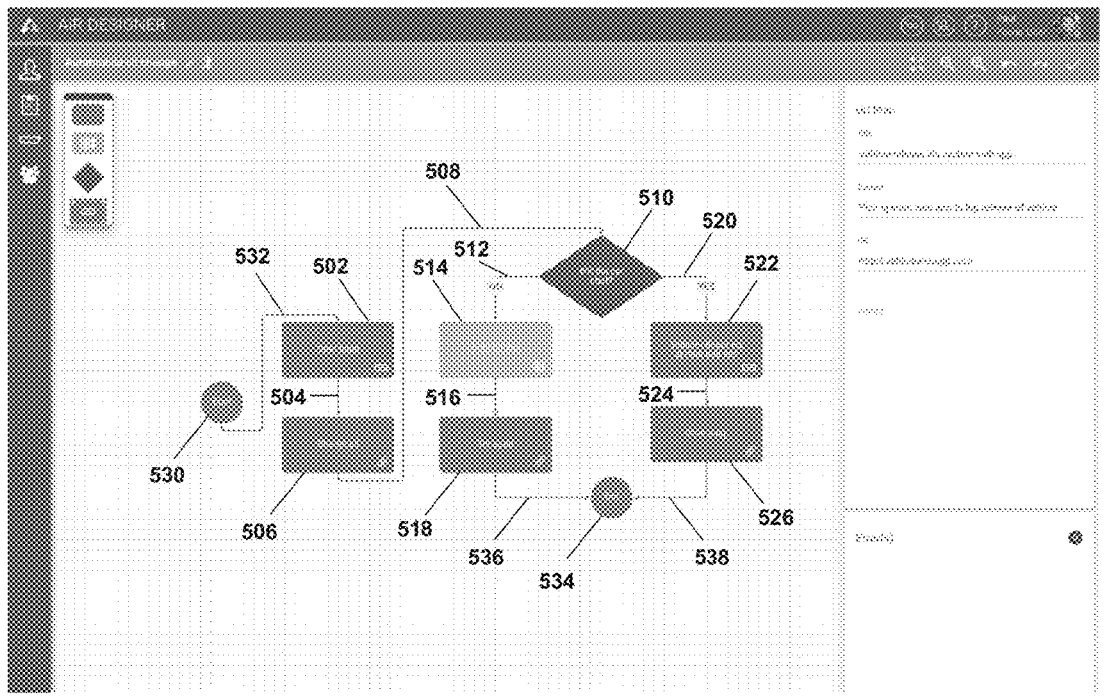
FIG. 5A shows an interface for authoring a script, according to an embodiment.
Figure 5B:
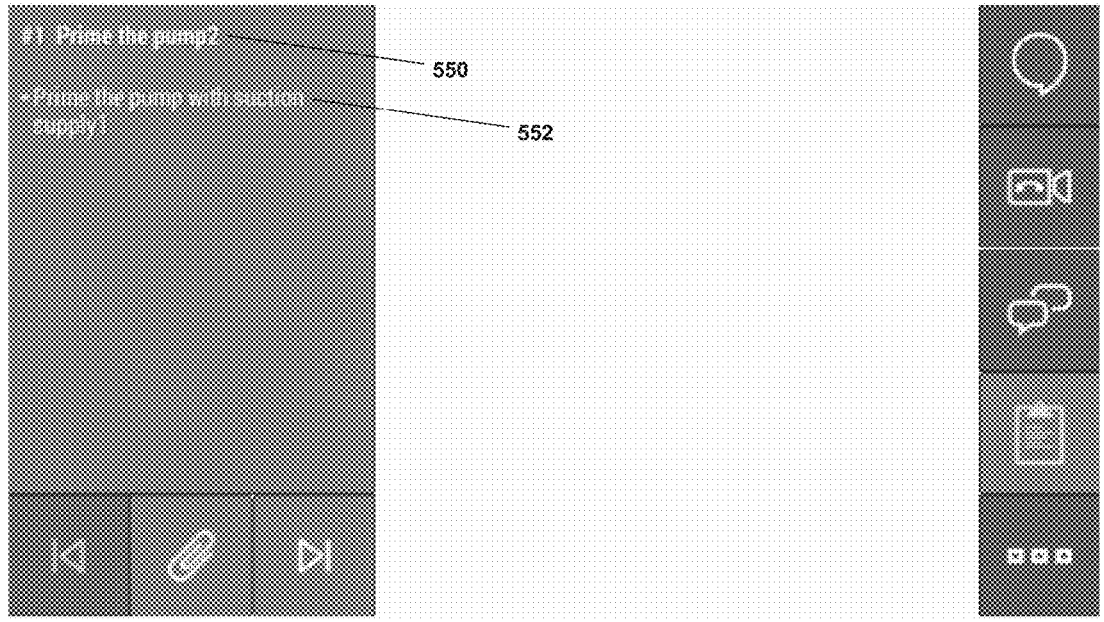
FIG. 5B shows an interface for executing a script, according to an embodiment.

FIG. 5A shows an interface for authoring a script, according to an embodiment. FIG. 5B shows an interface for executing a script, according to an embodiment. FIG. 5A may resemble what an author might see when authoring a script and FIG. 5B may resemble what an operator might see when executing a script. However, it is emphasized that the arrangements in FIG. 5A and FIG. 5B are examples only and are not limiting.

As may be seen in FIG. 5A, a script is shown therein, in the form of a flowchart (though the form of a flowchart is itself an example only, and is not limiting). The script exhibits seven steps 502, 506, 510, 514, 518, 522, and 526, engaged with and/or sequenced by six links 504, 508, 512, 516, 520, and 524. As may be seen the script in FIG. 5A corresponds to an automobile-related procedure. Broadly speaking the script proceeds from step 502 marked "Open hood" to step 506 marked "Change oil" via link 504, and then by link 508 to step 510 marked "Will the car start?" As may be understood, step 510 represents a decision to be made (and thus step 510 may be considered a decision step): the script branches along alternate links 512 and 520. If the car does not start (as shown by the "NO"), the script proceeds along link 512 to step 514, marked with "0123456789", and then along link 516 to step 518, marked with "Try again". However, if the car does start (as shown by "YES"), the script proceeds along link 520 to step 522, marked with "Vehicle release via system web app", then along link 524 to step 526, marked with "Drive away".

In addition, as may be seen several graphical elements are present in FIG. 5A that are not necessarily steps or links in a strict sense, but that may still serve purposes related to the script. A circular start icon element 530 marked with "Start" and another circular icon 534 marked with "End" may be seen. Similarly, arrows 532, 536, and 538 are visible, engaging the start and stop icons elements 530 and 534 with steps in the script.

Depending on the particulars of a script, an interface, etc., such elements as 530 through 538 may or may not be considered steps and/or links per se. A "start step" may have no actions, inputs, outputs, etc. associated therewith, and may merely be a convenience (whether for the author in scripting, the architect in creating script tools, etc.); likewise an "end step" may have no actions, inputs, outputs, etc. Similarly, if elements 530 and 534 are not considered steps, then arrows 532, 536, and 538 may not be considered links in that the arrows do not connect one step to another (assuming a given embodiment defines links as only linking active steps, which may not be the case for all embodiments). However, embodiments may vary in this regard; it is not required that "start" or "end" steps be included, nor that a start or end feature be considered a step, nor otherwise, that only steps and links be present in a script, etc. Scripts, interfaces, and tools therefor may vary considerably and are not limited.

Several example features also are noted in FIG. 5A.

As noted previously, different types of steps may be distinguished from one another, such as by shape, color, etc. Such an arrangement may be convenient to an author (e.g. as shown, the decision step 510 is darker and differently shaped than other non-decision steps), and/or may serve other purposes. Such distinctions (or other distinctions), while not required, potentially may be useful for at least certain embodiments.

In addition, it is noted that certain steps therein show icons in the bottom right corner thereof. For example, 502 and 522 show chain links, 506, 516, and 526 show paperclips, and 514 shows a bar code. Such icons (or other indicators) may serve to graphically represent features of or relating to the steps. Thus, chain links may indicate a link to something outside the script with respect to steps 502 and/or 522, such as linking to a separate script for opening the hood in 502 (e.g. depending on the vehicle type), activating the system web app referenced in 522, etc. Similarly, paper clips may represent files attached to the step and/or files that are to be attached to the step, such as a photograph verifying that the oil is being changed in 506. Likewise, the bar code may indicate recording numerical and/or coded information (such as the VIN or license plate number for the vehicle that won't start, for future reference), etc. Depending on usage and interface configuration, such icons may represent inputs to be acquired, outputs to be delivered, both, neither, etc. These are examples only, and other arrangements may be suitable.

Similarly, the text shown in steps 502, 506, 510, 514, 518, 522, and 526 may represent output to be delivered to an operator e.g. via an output cue, but alternatively or in addition may represent some other information, such as being a "title" or "flag" for assisting authors in recognizing the steps. As a more concrete example, "Change oil" in 506 may be actual text that is presented to an operator, or may be a "handle" for the script's author to refer to a step that includes many different input cues, output cues, etc. therein (although individual cues may not be individually shown in such a "high level" view of step 506), or may serve some other function.

In addition to steps 502, 506, 510, 514, 518, 522, and 526, links, 504, 508, 512, 516, 520, and 524, etc. as shown in FIG. 5A, author interfaces may include—as is visible in FIG. 5A—various other elements, such as windows, icons, menus, logos, etc. Interfaces and/or authoring therewith are not limited only to the use of steps and links, nor to any particular configuration or tools for steps and links.

Turning to FIG. 5B, therein is shown an illustration of an example interface for authoring executing a script. As may be seen, two lines of text 550 and 552 are visible in FIG. 5B, near the top of the gray-toned region on the left. In the arrangement shown, it may be considered that text 550 represents a step title, or a procedure title, etc., while text 552 may represent a text output (e.g. as delivered via an output cue). However, depending on precisely how steps, output cues, output, etc. are considered for a given embodiment, it may be reasonable to consider text 550 to be output from an output cue as well, etc.

In the arrangement of FIG. 5B, the overall arrangement is one a display field (e.g. for text) on the right, an open space in the center, a row of menu icons (e.g. for navigation, image and/or file attachment, etc.) below the display field, and a column of menu icons on the right. Such an arrangement may be suitable for example for an augmented reality system such as a head-mounted display, in that the operator's central vision may remain clear to allow viewing of the work being done (given the text 550 and 552, possibly some form of pump maintenance), while providing controls accessed e.g. via gesture input, and display space for instructions such as text 550 and 552 and/or other information. However, as with the author interface in FIG. 5A, the operator interface in FIG. 5B is an example only and is not limiting.

Figure 6:
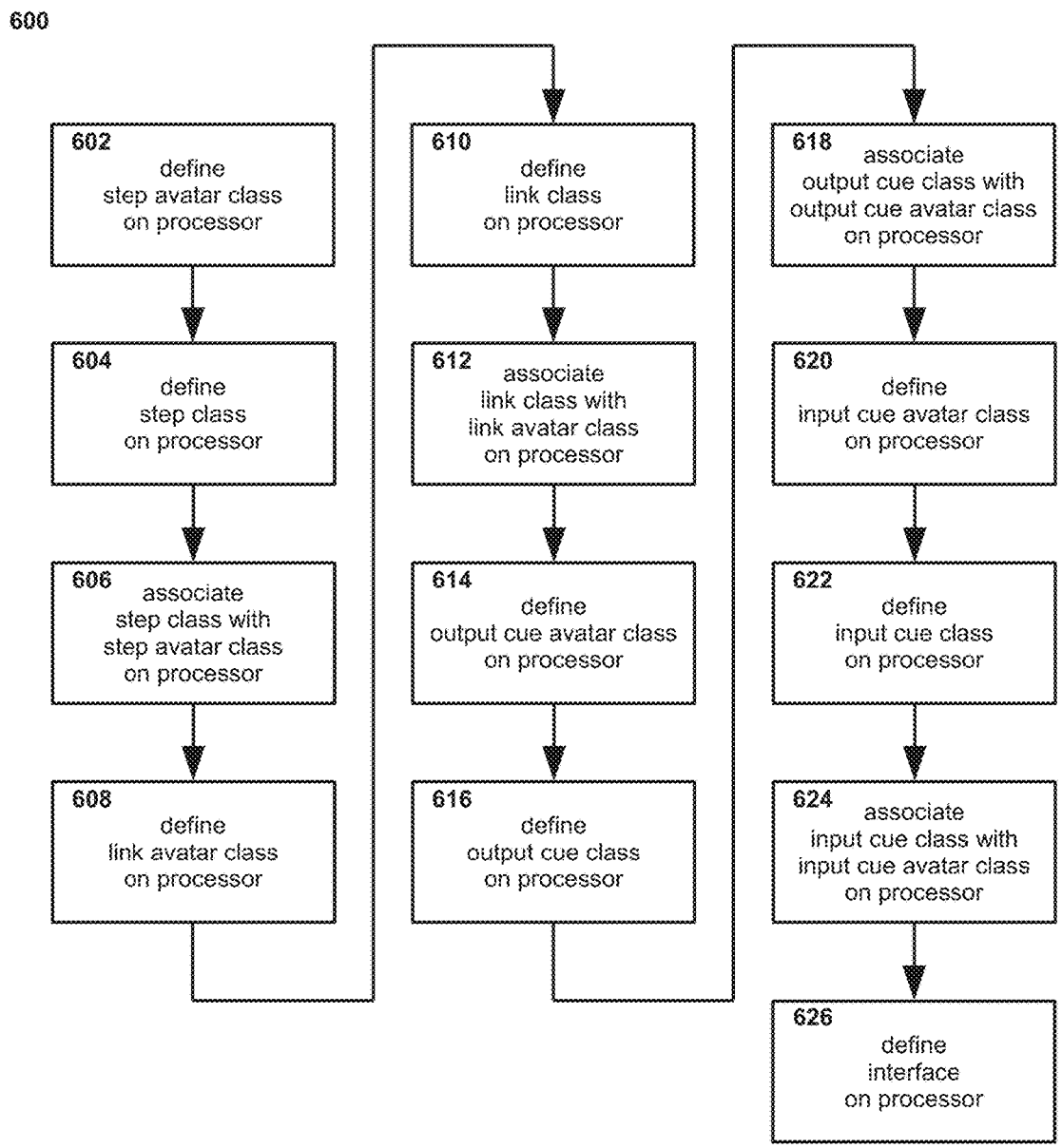
FIG. 6 shows a flowchart for providing guidance during a procedure and for confirming the execution of that procedure with regard to a scripting architect, according to an embodiment.

FIG. 6 shows a flow chart 600 for providing guidance during a procedure and for confirming the execution of that procedure with regard to a scripting architect, according to an embodiment. Where certain previous examples have shown the execution of a script by an operator, and creation of a script by an author, the arrangement in FIG. 6 refers to the provision of tools for an author to produce or modify a script that then may be executed by an operator. For purposes of description, such a person providing script authoring tools may be referred to as an architect. Thus, broadly speaking, an architect provides the "infrastructure" for authoring a script; an author creates the script itself; and an operator executes the script, such that executing the script at least substantially corresponds with executing a procedure.

In the arrangement of FIG. 6, a step avatar class is defined 602 on a processor. As noted previously, a "step avatar class" refers to a format for representing a step avatar (e.g. a graphical appearance to indicate a step), such as may be used for conveniently adding, deleting, and modifying steps while authoring a script.

Typically though not necessarily, the step avatar class is defined 602 by an architect, such as a human computer programmer. However, it should be understood that the nature of the architect, and the manner by which an architect may define 602 a step avatar class (and likewise carry out other actions in FIG. 6), may vary considerably from one embodiment to another. For example, an architect may be a single individual, may be several individuals cooperating together as a group, may be a series of individuals and/or groups working in different times and/or places (e.g. defining 602 different revisions of the step avatar class over time, in response to changes in processors, operating systems, user requirements, etc.). Likewise, defining 602 an avatar class may include creating executable instructions "from scratch", editing together pre-written commands, subroutines, etc., integrating functional "blocks" of instructions or "packages" of code (possibly in a pre-existing coding interface), etc. In principle defining 602 an avatar class could be carried out at a fundamental machine-code level, even to the point of coding 0s and 1s; in practice, however, it may also be suitable to define 602 an avatar class within some existing framework, such as taking advantage of an existing operating system, using and modifying commands and executable instructions therein, adding such commands and instructions as necessary, etc. As a more concrete example, an avatar class may be defined 602 within Android or some other mobile operating system, or within Windows or some other PC operating system, using the infrastructure and conventions thereof.

Continuing in FIG. 6, a step class is defined 604 on the processor. As noted previously, a step class refers to a format for a step in a script, that step at least substantially corresponding to an event in a procedure.

The step class is associated 606 with the step avatar class in the processor, such that disposing/manipulating a step avatar within an interface may dispose/manipulate a step within a script (as previously described). It is noted that in certain previous examples (such as FIG. 4), a step avatar class may he associated with a step class in authoring the script. Thus an author may so associate classes with respective avatar classes, therefore, as part of authoring the script. Such an arrangement may facilitate customization of avatars, for example; that is, an author may choose to utilize a rectangular avatar for certain steps or groups of steps, a diamond-shaped avatar for other steps or groups of steps, different colors of avatars, etc., based on personal preferences and/or other factors.

However, as shown in FIG. 6 it may be equally suitable to associate 606 a step class with a step avatar class as part of creating the tools for authoring scripts, rather than as part of authoring the script itself. Thus, some or all such associations may be implemented by an architect, rather than an author. However, such association may be "mixed and matched", i.e. some classes may be associated with avatar classes therefor by an architect while others are associated by the author, an architect may perform such association while an author may change the association, etc.

Moving on in FIG. 6, a link avatar class is defined 608 in the processor, for example by an architect. A link class is also defined 610 on the processor, and the link class is associated 612 with the link avatar class. As noted, a link avatar class refers to a representation (e.g. a graphical image) for various links as may exist within a script.

An output cue avatar class is defined 614 on the processor, an output cue class is defined 616 on the processor, and the output cue class is associated 618 with the output cue avatar class. As noted, an output cue class refers to a configuration for output cues, and an output cue avatar class refers to a representation for output cues.

Similarly, an input cue avatar class is defined 620 on the processor, an input cue class is defined 622 on the processor, and the input cue class is associated 624 with the input cue avatar class. Again as noted, an input cue class refers to a configuration for input cues, and an input cue avatar class refers to a representation for input cues.

Still with reference to FIG. 6, an interface is defined 626 in the processor. In certain previous examples (such as FIG. 4), an interface may be assumed as presently given the existence and manipulation of various classes and instances, may be considered to be part of or inherent to the definition of various classes, instances, etc. (for example, if classes exist, the classes enable formation of instances therefrom, manipulation of those instances is supported to author a script, etc., then enabling those functions may in itself constitute providing an interface), and so forth.

However, as shown in the arrangement of FIG. 6, the definition 626 of an interface may also be explicit. That is, some "space" may be defined (such as a window, a desktop, an augmented reality region, etc.), rules may be defined for that space with regard to how entities therein behave and are treated, and so forth. In such instance, some of the functionality associated with various classes and instances may, strictly speaking, be part of the interface itself. That is, the appearance (e.g. the size, color, etc.) of an instance of a step avatar class may be defined at least in part by the particulars of the interface, the behaviors and even association with an instance of a step class may be enabled by the interface, etc.

As with the various classes and instances, the interface itself may be defined 626 in a variety of manners. For example, an interface may be coded "from scratch", or may be adapted or even used as-is if a suitable interface already exists. As a more concrete example, an operating system such as Windows or Android may support the manipulation of various avatars in the form of graphical icons, and such functions may be utilized either as an interface or as some portion thereof. Other arrangements also may be suitable, and the nature of the interface and manner in which it is provided or defined is not limited.

Figure 7:
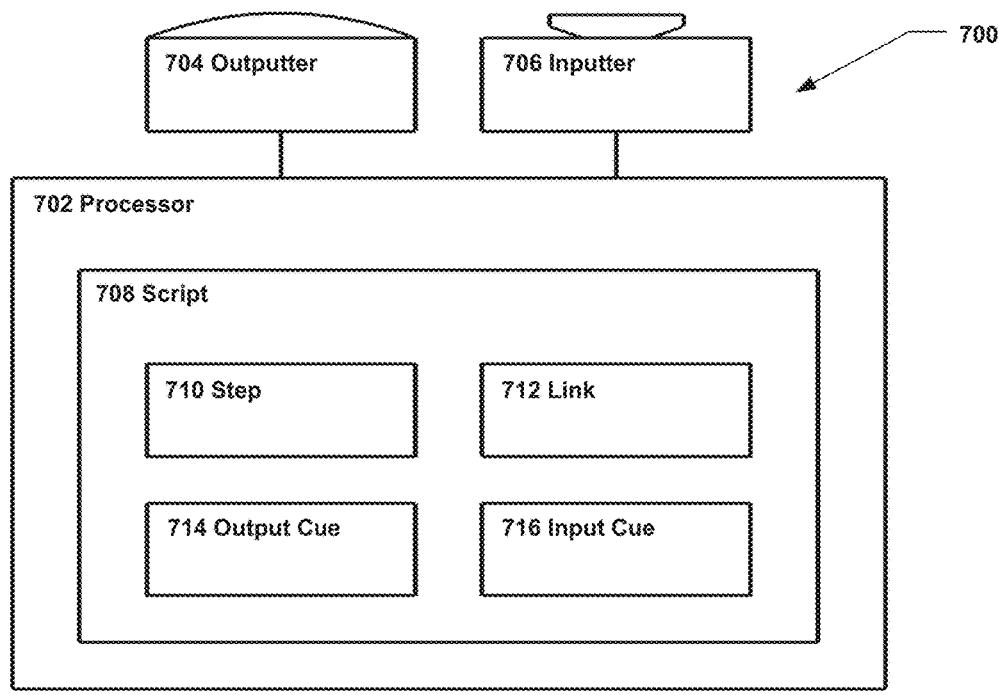
FIG. 7 shows an apparatus for providing guidance for or during a procedure and for confirming the execution of that procedure with regard to a scripting operator, according to an embodiment.

FIG. 7 shows an apparatus 700 for providing guidance for or during a procedure and for confirming the execution of that procedure with regard to a scripting operator, according to an embodiment. The arrangement shown in FIG. 7 refers to script execution, as previously described herein; thus, the script is being followed so that a procedure is carried out (e.g. at least in part by an operator).

As may be seen, the example apparatus 700 includes a processor 702. As noted previously, suitable processors may vary considerably, and may include but are not limited to digital processors such as may be found in smartphones, head-mounted displays, and other portable electronic devices, and as may be found in desktop and laptop computers.

An outputter 704 is disposed in communication with the processor 702. The outputter 704 also may vary considerably. The outputter 704 is adapted to deliver output cues (and potentially other content) to an operator (not shown); the outputter 704 also may be adapted to deliver content to targets other than an operator. As noted, output cues may vary considerably, including but not limited to displayed text, images, graphics, animations, video, etc. as well as audio and other formats. Consequently, an outputter 704 may vary considerably as well, depending on the particulars of what output cues are to be delivered and what form those output cues may take. For example, suitable outputters 704 may include but are not limited to visual displays such as LED, OLED, LCD, CRT, etc., whether stereo or mono, color, grayscale, or monochrome, etc. and as incorporated into a variety of forms such as PC monitors, hand-held electronic device displays, head-mounted near-eye displays, and so forth. Other arrangements also may be suitable. In FIG. 7, the outputter 704 is shown as a graphical mono display such as a CRT, but this is an example only; it is also noted that a given apparatus 700 is not limited to only a single outputter 704 as in the example shown.

An inputter 706 also is disposed in communication with the processor 702. The outputter 706 likewise may vary considerably. The inputter 706 is adapted to accept input cues (and potentially other content) from an operator; the inputter 706 also may be adapted to accept content from sources other than an operator. As also noted, input cues may vary considerably, including but not limited to gesture inputs, voice inputs, keyboard or other text inputs, image and/or video captures, etc. Thus an inputter 706 likewise may vary considerably, depending on the intended form, source, and nature of the input cues. For example, suitable inputters may include but are not limited to digital imagers such as RGB cameras and depth cameras, audio microphones, keypads, mice, etc. Such inputters 706 may take a variety of forms and/or be incorporated into a range of other systems, such as head mounted displays, smartphones, etc. Although the inputter 706 in FIG. 7 is shown as an imager such as a digital time-of-flight depth camera, this is an example only. Also, a given apparatus 700 is not limited only to a single inputter 706 as shown. Furthermore, it is noted that to at least some extent the inputter 706 (and likewise an outputter 704 above) may be or include elements other than hardware. For example, if hand gestures are anticipated as inputs, an inputter 706 may include a physical sensor adapted to receive images or other data of an operator's hands; however other components (such as executable instructions disposed on the processor 702) may be present for detecting and recognizing gesture inputs within such images. Although the inputter 706 is shown as a singular, discrete element, in practice the inputter 706 and/or other elements of the apparatus 700 may take multiple forms, be distributed or subdivided into subcomponents, etc. Other arrangements also may be suitable.

Still, with reference to FIG. 7, a script 708 is instantiated on the processor 702. Typically though not necessarily, the script 708 may be a data entity, formed of executable instructions and/or data, etc. Regardless of form, the script 708 is adapted such that executing the script 708 substantially corresponds to executing a procedure.

The script 708, in turn, includes at least one step 710, link 712, output cue 714, and input cue 716. (Only one each is shown for simplicity, though many such may be and typically will be present.) The steps 710, links 712, output cues 714, and input cues 716 likewise may be data entities, formed of executable instructions and/or data, etc. As described previously, the steps 710 correspond with events of the procedure, the links 712 correspond with the sequencing of the events, the output cues 714 specify outputs from the processor 702 e.g. for providing procedure guidance to an operator, and the input cues 716 specify inputs to the processor 702 e.g. for confirming procedure execution.

In the apparatus 700, the processor 702 is adapted to execute the script 708 beginning with an initial one of the steps 710, executing that initial step 710 (with at least some steps being at least partly operator-implemented), and following links 712 to other steps 710 as the various output and input cues 714 and 716 are satisfied, until execution of the script 708 has been completed. Thus, in cooperating to execute the script 708, the processor 702 and an operator cooperate to execute the corresponding procedure.

Figure 8:
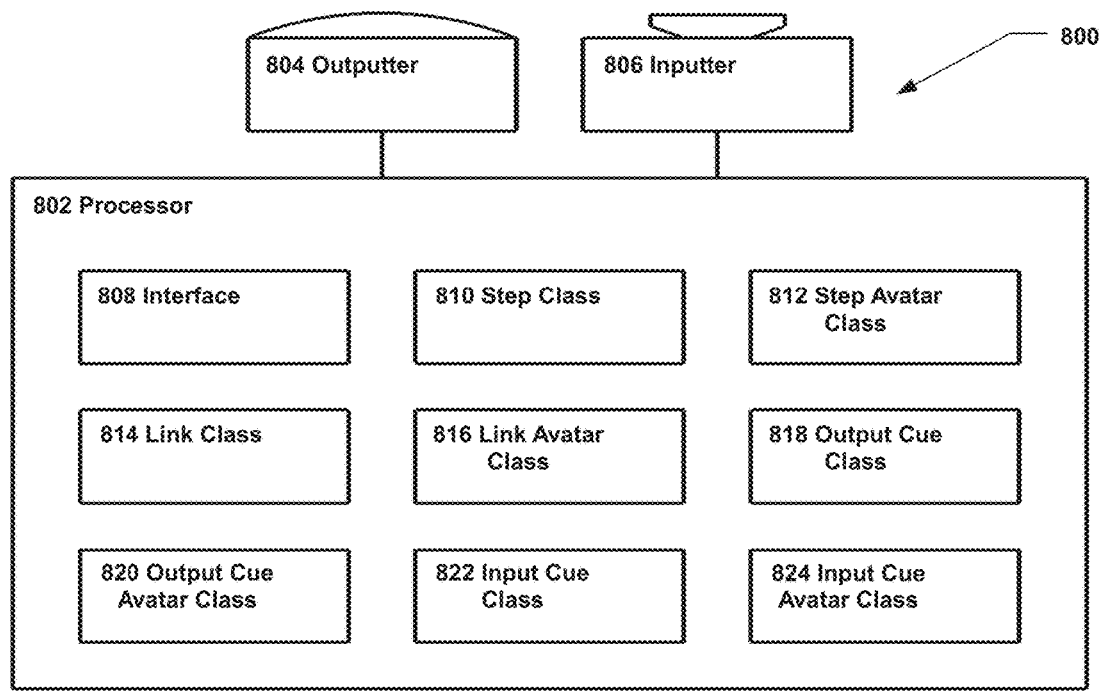
FIG. 8 shows an apparatus for providing guidance for or during a procedure and for confirming the execution of that procedure with regard to a scripting author, according to an embodiment.

FIG. 8 shows an apparatus 800 for providing guidance for or during a procedure and for confirming the execution of that procedure with regard to a scripting author, according to an embodiment. The arrangement shown in FIG. 8 refers to script creation and modification, as previously described herein; thus, the script is being configured (e.g. at least in part by an author) so as to correspond with a procedure, such that when the script is followed that procedure is carried out (e.g. at least in part by an operator).

The example apparatus 800 includes a processor 802, an outputter 804 disposed in communication with the processor 802, and an inputter 806 also disposed in communication with the processor 802. At least in terms of the processor 802, outputter 804, and inputter 806, the apparatus 800 may resemble an apparatus 700 as shown in FIG. 7, although the apparatus 700 in FIG. 7 is described with regard to executing scripts while the apparatus 800 in FIG. 8 is described with regard to authoring scripts. Indeed, it may be suitable for a single hardware device to be adapted both for executing scripts and for authoring scripts (and/or for architecting tools for authoring scripts as also previously described); for example, a given head-mounted display (or another device) may be used both for authoring a script for a procedure and to execute that script to perform the procedure (possibly by different individuals at different times and places, etc.). Thus, comments with regard to hardware elements in FIG. 7 may apply similarly to elements in FIG. 8. In embodiments with such dual functions, an apparatus may include elements both as shown in FIG. 7 and as shown in FIG. 8, and/or other elements; in more colloquial terms, software for running scripts and writing them may be loaded on the same system (and other software also may be present). While such arrangements are not prohibited, neither are such arrangements required for all embodiments.

Continuing in FIG. 8, a number of elements 808 through 824 are shown instantiated on the processor 802. These elements 808 through 824 may be data entities, e.g. executable instructions and/or data.

In particular, an interface 808 is disposed on the processor. The interface 808 is adapted for configuring steps, links, cues, and avatars therefor so as to form a script, that script being such that executing the script at least substantially corresponds to executing a procedure. In particular, the interface 808 is adapted to enable an author to so configure steps, links, cues, avatars therefor, etc. so as to author such a script.

As shown in FIG. 8, the interface 808 is a stand-alone element, essentially a "playing field" where the other elements 810 through 824 may perform functions. However, it may be equally suitable for the interface 808 to be considered a "parent" element, that is, for the other elements 810 through 824 to be considered as part of the interface 808 itself. Such a distinction may be academic in many if not all embodiments (e.g. being simply different ways of describing functionally equivalent arrangements), but even if of practical importance the distinction is not limiting.

A step class element 810 and a step avatar class 812 are disposed on the processor 802. The step class element 810 and step avatar class 812 are associated, such that disposing an instance of the step avatar class 812 within the interface 808 also disposes an instance of the step class element 810 as a step within a procedure. Thus, adding, moving, modifying, or deleting a step avatar within the interface 808 would add, move, modify, or delete an associated step within the script.

A link class 814 and a link avatar class 816 also are disposed on the processor 802. The link class 814 and link avatar class 816 are associated similarly to the step class element 810 and step avatar class 812 above, such that disposing an instance of the link avatar class 816 within the interface 808 similarly disposes an instance of the link class 814 as a link within the procedure.

An output cue class 818 and an output cue avatar class 820 are disposed on the processor 802, as are an input cue class 822 and an input cue avatar class 824. The output cue class 818 and the output cue avatar class 820 are associated, and the input cue class 822 and the input cue avatar class 824 are associated, such that disposing an instance of the output cue avatar class 820 or the input cue avatar class 824 within the interface 808 also disposes an instance of the output cue class 818 or the input cue class 822 as an output cue or input cue respectively within the procedure.

In the apparatus 800, the processor 802 is adapted to configure instances of the step class element 810, link class 814, output cue class 818, and input cue class 822 in response to configuration (e.g. by an author) of instances of the step avatar class 812, link avatar class 816, output cue avatar class 820, and input cue avatar class 824 within the interface 808, so as to enable authoring of a script (the script not being shown in FIG. 8), such that executing that script at least substantially corresponds with executing a procedure.

Figure 9:
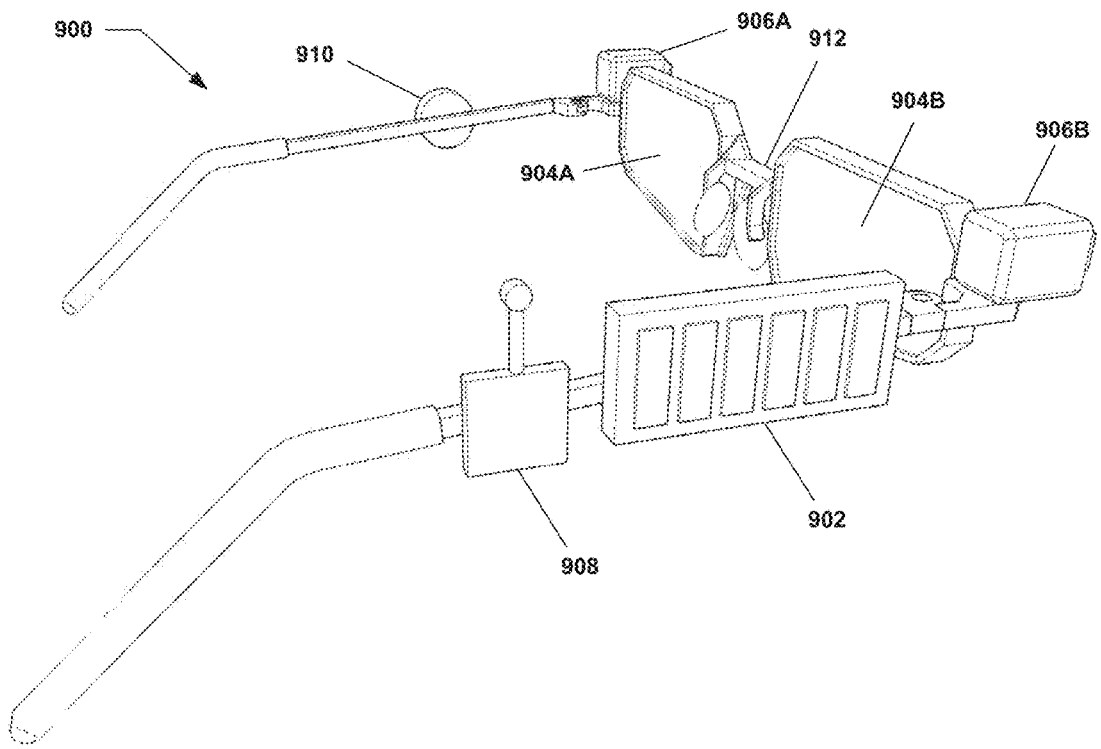
FIG. 9 shows an apparatus for providing guidance for or during a procedure and for confirming the execution of that procedure, according to an embodiment.

FIG. 9 shows an apparatus 900 for providing guidance for or during a procedure and for confirming the execution of that procedure, according to an embodiment. As noted with regard to FIG. 7 and FIG. 8, a given apparatus may not be limited only to one aspect of providing procedure guidance and confirming procedure execution, e.g. to executing scripts only, to authoring scripts only, etc. The arrangement shown in FIG. 9 likewise is not necessarily limited only to one such aspect; depending on particulars, the apparatus 900 may be adapted for facilitating an operator in executing scripts, facilitating an author in authoring scripts, facilitating an architect in defining tools for authoring scripts, some combination thereof, etc.

As may be seen, the apparatus 900 includes a processor 902. Depending on the embodiment and which aspect(s) the apparatus 900 may be configured to carry out, the processor may include data entities disposed thereon, such as one or more scripts with steps, links, output cues, and input cues (as shown in FIG. 7), and/or an interface, step class, step avatar class, link class, link avatar class, output cue class, output cue avatar class, input class, and input cue avatar class (as shown in FIG. 8), etc.; however, data entities typically not being visible in perspective view, such data entities are not illustrated in FIG. 9.

The apparatus 900 also includes the outputters 904A and 904B, configured as left and right stereo graphical displays in the example embodiment shown. Such the outputters 904A and 904B may for example output graphical information to an operator (and/or an author, architect, another target, etc.), such as output cues with text, images, animations, etc. One non-limiting concrete example would be augmented reality content, displayed overlaying a view of the physical world through see-through displays (e.g. the outputters 904A and 904B).

The apparatus 900 includes inputters 906A and 906B, configured as left and right stereo imagers in the example shown. Such inputters 906A and 906B may, for example, accept visual input information from an operator (or another source), such as input cues with images or video of the physical world, inputs from an operator, etc. One non-limiting concrete example would be hand gestures carried out within the field of view of the inputters 906A and 906B, with gestures being detected and recognized within captured images (e.g. using executable instructions for gesture recognition as may be instantiated on the processor 902) as user commands.

As may be seen, the processor 902, the outputters 904A and 904B, and inputters 906A and 906B are shown engaged with a body 912. The body 912 in the example of FIG. 9 is in the form of a pair of glasses, such that the apparatus 900 may be worn as a head-mounted display. As may be understood, in such configuration with the apparatus 900 is worn the outputters 904A and 904B may be disposed substantially facing, proximate, and aligned with the wearer's eyes, while the inputters 906A and 906B may be disposed facing substantially forward with respect to the wearer's head, e.g. such that the inputters 906A and 906B may exhibit a field of view at least somewhat similar to that of the wearer (so that the inputters 906A and 906B "see what the user sees"), and/or at least including a region in front of the wearer convenient to the wearer in executing gesture inputs. However, the arrangement shown and described with regard to FIG. 9 is an example only, and other arrangements also may be suitable.

Embodiments may vary considerably. Although not necessarily required, additional elements are shown for the apparatus 900 in FIG. 9. For example, a communicator 908 is shown disposed on the body 912. Such a communicator 908 may, for example, enable communication between the apparatus 900 and/or a wearer thereof (e.g. an operator for a script) with other persons, systems, etc. A data store 910 also is shown disposed on the body 912. Such a data store 910 may, for example, enable scripts or portions thereof, classes or instances thereof, etc. to be instantiated onto the processor 902 from stored memory, may enable recall information for supporting scripts or creation thereof, may store inputs as received e.g. from the inputters 906A and 906B, etc.

In addition, depending on the particulars, elements such as the communicator 908 and the data store 910 may function as and/or be considered as the inputters, the outputters, etc. in their own right. For example, if a machine is being serviced as part of a procedure, and that machine includes an RFID tag, the RFID tag may be queried by the communicator 908 and the information from that RFID tag may be received by the communicator; thus the communicator 908 may be considered to have performed an output cue (querying) and an input cue (accepting data), and at least arguably may be considered as an outputter and an inputter.

In addition, even though the apparatus 900 as shown includes a processor 902, for certain embodiments a processor that is supporting the execution, authoring, etc. of scripts may in fact be physically separate from the remainder of an apparatus; thus an apparatus may have no onboard processor, relying on a remote processor, cloud processing, etc., as facilitated for example by a communicator 908. It should be understood that other elements likewise may be distributed and/or abstracted; while the arrangement for the apparatus 900 shown is presented for an explanation, a wide variety of different embodiments may serve the functions as described herein.

Figure 10:
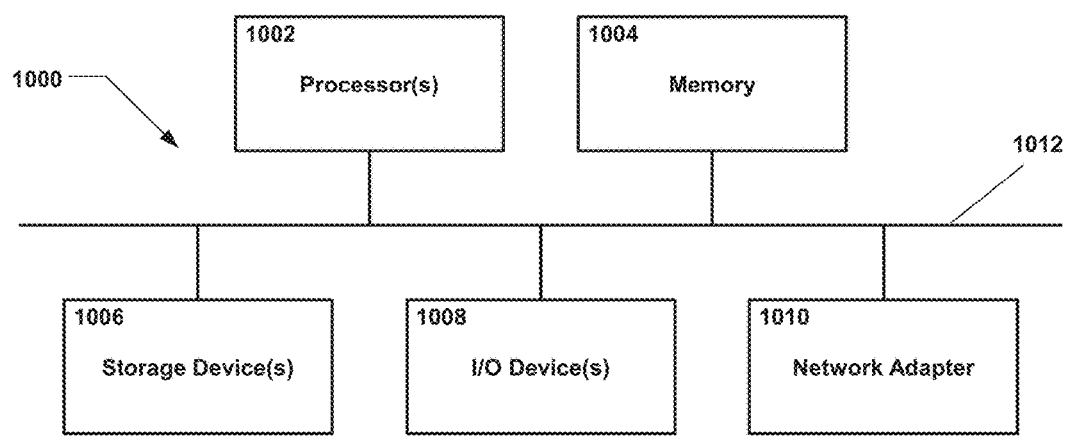
FIG. 10 shows a block diagram is shown of an apparatus that may perform various operations, and store various information generated and/or used by such operations, according to an embodiment.

FIG. 10 shows a block diagram is shown of an apparatus 1000 that may perform various operations, and store various information generated and/or used by such operations, according to an embodiment. The apparatus may represent any computer or processing system described herein. The processing system 1000 is a hardware device on which any of the other entities, components, or services depicted in the examples of FIG. 1 through FIG. 14 (and any other components described in this specification) may be implemented. The processing system 1000 includes one or more processors 1002 and memory 1004 coupled to an interconnect 1012. The interconnect 1012 is shown in FIG. 15 as an abstraction that represents any one or more separate physical buses, point to point connections, or both connected by appropriate bridges, adapters, or controllers. The interconnect 1012, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an institute of Electrical and Electronics Engineers (IEEE) standard 1394 bus, also called "Firewire".

The processor(s) 1002 is/are the central processing unit of the processing system 1000 and, thus, control the overall operation of the processing system 1000. In certain embodiments, the processor(s) 1002 accomplish this by executing software or firmware stored in memory 1004. The processor(s) 1002 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1004 is or includes the main memory of the processing system 1000. The memory 1004 represents any form of random access memory (RAM), read-only memory (ROM), flash memory, or the like, or a combination of such devices. In use, the memory 1004. may contain a code. In one embodiment, the code includes a general programming module configured to recognize the general-purpose program received via the computer bus interface and prepare the general-purpose program for execution at the processor. In another embodiment, the general programming module may be implemented using hardware circuitry such as ASICs, PLDs, or field-programmable gate arrays (FPGAs).

The network adapter 1010, a storage device(s) 1006, and I/O device(s) 1008, are also connected to the processor(s) 1002 through the interconnect 1012 The network adapter 1010 provides the processing system 1000 with the ability to communicate with remote devices over a network and may be, for example, an Ethernet adapter or Fibre Channel adapter. The network adapter 1010 may also provide the processing system 1000 with the ability to communicate with other computers within the cluster. In some embodiments, the processing system 1000 may use more than one network adapter to deal with the communications within and outside of the cluster separately.

The I/O device(s) 1008 can include, for example, a keyboard, a mouse or other pointing device, disk drives, printers, a scanner, and other input and/or output devices, including a display device. The I/O device(s) 1008 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 1004 may be implemented as software and/or firmware to program the processor(s) 1002 to carry out actions described herein. In certain embodiments, such software or firmware may be initially provided to the processing system 1000 by downloading from a remote system through the processing system 1000 (e.g., via network adapter 1010).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 1006 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the embodiment. Since many embodiments of the embodiment can be made without departing from the spirit and scope of the embodiments, the embodiments resides in the claims hereinafter appended.

The invention claimed is:

1. An apparatus, comprising:
a housing adapted to be worn on a head of an operator;
an environmental sensor configured to measure an environmental condition in an area approximate the housing to obtain an environmental measurement;
a processing device coupled to the housing and the environmental sensor;
a stereographical display in communication with the processing device and attached to the housing such that when the housing is worn by the operator the stereographical display is facing and proximate eyes of the operator; and
an input device in communication with the processing device and disposed on the housing, wherein the processing device is to:
determine whether the environmental condition is present in the area approximate the housing based on the environmental measurement;
in response to the environmental condition being present in the area approximate the housing:
send a first output to the stereographical display, the first output comprising a first graphical object associated with a first step of a first branch of a user-implemented procedure;
receive a first input from the input device, the first input representative of feedback from the operator performing the user-implemented procedure, wherein the first input indicates a progress on an execution of the first step of the first branch by the operator;
determine whether the first input indicates that the operator has completed the first step of the first branch;
determine whether the first step of the first branch is a final step in the first branch of the user-implemented procedure; and
identify a link to a subsequent step of the first branch in the user-implemented procedure when the first input indicates that the operator has completed the first step of the first branch and the first step is not the final step in the first branch; and
in response to the environmental condition not being present in the area approximate the housing:
send a second output to the stereographical display, the second output comprising a second graphical object associated with a first step of a second branch of the user-implemented procedure;
receive a second input from the input device, the second input representative of feedback from the operator performing the user-implemented procedure, wherein the second input indicates a progress on an execution of the first step of the second branch by the operator;
determine whether the second input indicates that the operator has completed the first step of the second branch;
determine whether the first step of the second branch is a final step in the second branch of the user-implemented procedure; and
identify a link to a subsequent step in the user-implemented procedure when the second input indicates that the operator has completed the first step of the second branch and the first step is not the final step of the second branch.

2. The apparatus of claim 1, wherein the input device is attached to the housing such that when the housing is worn by the operator, the input device faces substantially away from the head of the operator.

3. The apparatus of claim 1, wherein the input device is attached to the housing such that when the housing is worn by the operator, the input device faces substantially toward the head of the operator.

4. The apparatus of claim 1, wherein the input device is a color camera or a depth camera.

5. The apparatus of claim 1, wherein:
the first graphical object is to provide guidance to the operator for executing the first step of the first branch of the user-implemented procedure; and
the second graphical object is to provide guidance to the operator for executing the first step of the second branch of the user-implemented procedure.

6. An apparatus, comprising:
a display;
an environmental sensor configured to measure an environmental condition in an area approximate the apparatus to obtain an environmental measurement;
an input device; and
a processing device coupled to the display, the environmental sensor, and the input device, wherein the processing device is to:
determine whether an environmental condition is present in the area approximate the apparatus based on the environmental measurement;
in response to the environmental condition being present in the area approximate the housing:
send an first output to the display, the first output comprising a first graphical object associated with a first step of a first branch of a user-implemented procedure;

receive first input from the input device, the first input indicating a progress on an execution of the first step of the first branch by an operator;

determine whether the first input indicates that the operator has completed the first step of the first branch;

determine whether the first step of the first branch is a final step in the first branch of the user-implemented procedure; and identify a second step of the first branch in the user-implemented procedure when the first input indicates that the operator has completed the first step of the first branch and the first step is not a final step in the first branch; and in response to the environmental condition not being present in the area approximate the apparatus:

send a second output to the display, the second output comprising a second graphical object associated with a first step of a second branch of the user-implemented procedure;

receive a second input from the input device, the second input representative of feedback from the operator performing the user-implemented procedure, wherein the second input indicates a progress on an execution of the first step of the second branch by the operator;

determine whether the second input indicates that the operator has completed the first step of the second branch;

determine whether the first step of the second branch is a final step in the second branch of the user-implemented procedure; and identify a link to a second step in the user-implemented procedure when the second input indicates that the operator has completed the first step of the second branch and the first step is not the final step of the second branch.

7. The apparatus of claim 6, wherein the display is attached to a housing such that when the housing is worn by the operator the display is facing and proximate eyes of the operator.

8. The apparatus of claim 6, wherein completing the first step of the first branch comprises at least one of receiving the first input, confirming a presence of content in the first input, confirming a type of the content in the first input, confirming a format of the content in the first input, confirming the content in the first input satisfies an input standard, or confirming a presence of a feature in the content in the first input.

9. The apparatus of claim 6, further comprising identifying, by the processing device, an identity of at least one of the operator, the processing device, or the first input.

10. The apparatus of claim 6, further comprising establishing, by the processing device, a communication channel between a device associated with the operator and the processing device.

11. The apparatus of claim 6, further comprising establishing, by the processing device, a communication channel between the processing device and another device associated with an individual that is not the operator.

12. The apparatus of claim 6, wherein:
the second step of the first branch is non-linear to the first step of the first branch; and
the second step of the second branch is non-linear to the first step of the second branch.

13. The apparatus of claim 6, wherein:
the first step of the first branch comprises a first set of sub-steps; and
the first step of the second branch comprises a second set of sub-steps.

14. A method, comprising:
sensing, by an environmental sensor, an environmental condition in an area approximate a housing to obtain an environmental measurement;

determining, by a processing device, whether an environmental condition is present in the area approximate the housing based on the environmental measurement;

in response to the environmental condition being present in the area approximate the housing:

sending, by the processing device, a first output to display on a display device, the first output comprising a first graphical object associated with a first step of a first branch of a user-implemented procedure, wherein the display device is to display the first graphical object to provide guidance to an operator for executing the first step of the first branch of the user-implemented procedure;

receiving, by the processing device, a first input from an input device, the first input representative of feedback from the operator indicating a progress on an execution of the first step of the first branch;

analyzing the first input of the first branch to determine whether the first input indicates that the operator has completed the first step of the first branch;

determining whether the first step of the first branch is a final step of the first branch in the user-implemented procedure; and identifying a link to a subsequent step of the first branch in the user-implemented procedure when the first input indicates that the operator has completed the first step of the first branch and the first step is not the final step of the first branch; and in response to the environmental condition not being present in the area approximate the housing:

sending a second output to the display, the second output comprising a second graphical object associated with a first step of a second branch of the user-implemented procedure;

receiving, by the processing device, a second input from the input device, the second input representative of feedback from the operator performing the user-implemented procedure, wherein the second input indicates a progress on an execution of the first step of the second branch by the operator;

determining, by the processing device, whether the second input indicates that the operator has completed the first step of the second branch;

determining, by the processing device, whether the first step of the second branch is a final step in the second branch of the user-implemented procedure; and identifying, by the processing device, a link to a subsequent step in the user-implemented procedure when the second input indicates that the operator has completed the first step of the second branch and the first step is not the final step of the second branch.

15. The method of claim 14, wherein the first graphical object of the first output or the second graphical object of the second output comprises at least one of text, a schematic, a graphic, an image, an animation, a video, audio, augmented reality content, virtual reality content, stereo content, an executable instruction, or an external communication.

16. The method of claim 14, wherein the first graphical object of the first output or the second graphical object of the second output is displayed automatically by the display device.

17. The method of claim 14, further comprising retrieving, by the processing device, the first output in response to at least one of an expiration of a timer, receiving a user command, or an environmental factor.

18. The method of claim 14, wherein the display device is to display the first output to an individual other than the operator.

19. The method of claim 14, further comprising receiving, by the processing device, a confirmation of display by the display device.

20. The method of claim 14, wherein the first input or the second input comprises at least one of text, an image, a video, audio, augmented reality content, virtual reality content, stereo content, an executable instruction, an external communication, a selection input, a machine-readable code, or sensor data.

* * * * *